US011249961B2

(12) United States Patent
Varadarajan et al.

(10) Patent No.: US 11,249,961 B2
(45) Date of Patent: Feb. 15, 2022

(54) ONLINE SCHEMA CHANGE OF RANGE-PARTITIONED INDEX IN A DISTRIBUTED STORAGE SYSTEM

(71) Applicant: Microsoft Technology Licensing, LLC, Redmond, WA (US)

(72) Inventors: Krishnan Varadarajan, Redmond, WA (US); Jianwu Gao, Shanghai (CN); Jegan Devaraju, Redmond, WA (US); Shane Mainali, Duvall, WA (US); Zichen Sun, Sammamish, WA (US); Quan Zhang, Kenmore, WA (US); Venkates Paramasivam Balakrishnan, Redmond, WA (US); Shaoyu Zhang, Shanghai (CN); Kaifeng Zhu, Nanjing (CN); Ju Wang, Cupertino, CA (US); Manish Chablani, Redmond, WA (US); Hao Feng, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 74 days.

(21) Appl. No.: 16/617,443

(22) PCT Filed: Jun. 30, 2017

(86) PCT No.: PCT/CN2017/091087
§ 371 (c)(1),
(2) Date: Nov. 26, 2019

(87) PCT Pub. No.: WO2019/000386
PCT Pub. Date: Jan. 3, 2019

(65) Prior Publication Data
US 2020/0142868 A1    May 7, 2020

(51) Int. Cl.
*G06F 16/21* (2019.01)
*G06F 16/22* (2019.01)
(Continued)

(52) U.S. Cl.
CPC ........ *G06F 16/211* (2019.01); *G06F 16/2282* (2019.01); *G06F 16/23* (2019.01); *G06F 16/278* (2019.01)

(58) Field of Classification Search
CPC .... G06F 3/0607; G06F 16/278; G06F 3/0644; G06F 16/211; G06F 16/23; G06F 3/064; G06F 3/067; G06F 16/2282
(Continued)

(56) References Cited

U.S. PATENT DOCUMENTS

| 6,182,121 | B1 | 1/2001 | Wlaschin |
| 8,027,961 | B2 | 9/2011 | Cooper |

(Continued)

FOREIGN PATENT DOCUMENTS

| CN | 104809237 A | 7/2015 |
| CN | 105893531 A | 8/2016 |

(Continued)

OTHER PUBLICATIONS

"Extended European Search Report Issued in European Patent Application No. 17915803.5", dated Dec. 18, 2020, 07 Pages.
(Continued)

Primary Examiner — Kuen S Lu
(74) Attorney, Agent, or Firm — Mannava & Kang, P.C.

(57) ABSTRACT

A distributed storage system includes table controllers collectively storing partitions of a logical table having multiple rows. For each of the partitions, a corresponding table controller stores a subset of the rows of the logical table across individual pages. A management controller updates a schema of the logical table from a first to a second schema
(Continued)

definition by, for each of the partitions, sending an update command indicating the second schema definition to the corresponding table controller. The first table controller corresponds to a first partition that includes a first subset of the rows. The first table controller, prior to receiving the update command, includes an identifier of the first schema definition within each page of data for the first subset. Subsequent to receiving the update command, the first table controller, when writing each new page of data for the first subset, includes an identifier of the second schema definition.

20 Claims, 14 Drawing Sheets

(51) Int. Cl.
*G06F 16/23* (2019.01)
*G06F 16/27* (2019.01)

(58) Field of Classification Search
USPC .......................................................... 707/805
See application file for complete search history.

(56) References Cited

U.S. PATENT DOCUMENTS

| | | | |
|---|---|---|---|
| 8,176,021 B2 | 5/2012 | Kodavalla et al. | |
| 8,412,689 B2 | 4/2013 | Reid et al. | |
| 8,793,230 B2 | 7/2014 | Engelko et al. | |
| 8,924,950 B2 | 12/2014 | McDonald et al. | |
| 8,924,952 B1 | 12/2014 | Hou | |
| 9,177,079 B1 | 11/2015 | Ramachandran et al. | |
| 9,400,816 B1 | 7/2016 | Gubarev et al. | |
| 9,507,843 B1 | 11/2016 | Madhavarapu et al. | |
| 9,547,672 B2 | 1/2017 | Mansur | |
| 10,853,182 B1* | 12/2020 | Vig | G06F 16/1815 |
| 2006/0271540 A1* | 11/2006 | Williams | G06F 16/10 |
| 2007/0271211 A1 | 11/2007 | Butcher et al. | |
| 2012/0029930 A1 | 2/2012 | Calle et al. | |
| 2013/0006950 A1* | 1/2013 | Adayilamuriyil | G06F 16/278 |
| | | | 707/704 |
| 2013/0282976 A1 | 10/2013 | Dubnicki | |
| 2014/0279855 A1 | 9/2014 | Tan et al. | |
| 2014/0279961 A1* | 9/2014 | Schreter | G06F 3/0673 |
| | | | 707/693 |
| 2015/0106407 A1 | 4/2015 | Adayilamuriyil et al. | |
| 2015/0261807 A1 | 9/2015 | Pathak et al. | |
| 2015/0293945 A1 | 10/2015 | Amrhein et al. | |
| 2015/0310053 A1 | 10/2015 | Kim | |
| 2015/0339359 A1* | 11/2015 | Takaoka | G06F 16/211 |
| | | | 707/602 |
| 2016/0147814 A1* | 5/2016 | Goel | G06F 16/2393 |
| | | | 707/600 |
| 2016/0188690 A1 | 6/2016 | Tan et al. | |
| 2016/0210053 A1 | 7/2016 | Frank et al. | |
| 2016/0267132 A1 | 9/2016 | Castellanos et al. | |
| 2016/0292192 A1 | 10/2016 | Bhagat et al. | |
| 2020/0142878 A1 | 5/2020 | Varadarajan et al. | |

FOREIGN PATENT DOCUMENTS

| | | |
|---|---|---|
| CN | 105956183 A | 9/2016 |
| CN | 106446197 A | 2/2017 |
| CN | 106708425 A | 5/2017 |
| CN | 106777351 A | 5/2017 |

OTHER PUBLICATIONS

"Extended European Search Report Issued in European Patent Application No. 17915830.8", dated Dec. 14, 2020, 10 Pages.
"Schema Directory Partition", Retrieved From: https://technet.microsoft.com/en-us/library/cc756402(v=ws.10).aspx, Feb. 21, 2017, 1 Page.
Aiyer, et al., "Storage Infrastructure Behind Facebook Messages Using HBase at Scale", Published In Journal of IEEE Data Engineering Bulletin, vol. 35, Issue 2, Jun. 2012, 10 Pages.
Levandoski, et al., "LLAMA: A Cache/Storage Subsystem For Modern Hardware", In Proceedings of the VLDB Endowment, vol. 6, Issue 10, Aug. 2013, pp. 877-888.
"International Search Report and Written Opinion Issued In PCT Application No. PCT/CN17/091091", dated Apr. 8, 2018, 7 Pages.
"International Search Report and Written Opinion Issued In PCT Application No. PCT/CN2017/091087", dated Apr. 8, 2018, 7 Pages.
Vimercati, et al., "Supporting Concurrency and Multiple Indexes in Private Access to Outsourced Data", Published In Journal of Computer Security, vol. 21, Issue 3, Jan. 1, 2013, 38 Pages.

* cited by examiner

ONLINE SCHEMA CHANGE OF RANGE-PARTITIONED INDEX IN A DISTRIBUTED STORAGE SYSTEM

CLAIM FOR PRIORITY

The present application is a national stage filing under 35 U.S.C 371 of PCT application number PCT/CN2017/091087, having an international filing date of Jun. 30, 2017, the disclosure of which is hereby incorporated by reference in its entirety.

FIELD

The present disclosure relates to distributed storage systems and, more particularly, to distributed storage systems with partitioned indices.

BACKGROUND

Modifying data formats, protocols, and fundamental logic in a storage system is a complex problem, especially in a distributed and partitioned environment. Such changes may be necessitated by new features, services, and data types. For example, a schema may be updated to add columns necessary for more granular billing of services. In another example, new logic is required to support more efficient index management procedures.

In many environments that are distributed and, partitioned, the customer or client does not control in which partition their data is stored and the partitioning may change over time. As a result, when modifying data formats, protocols, or fundamental logic, the change must be performed across all of the partitions at once. This allows customers to be informed of the change so that they can then access their data according to this change. However, performing upgrades on large data sets is not instantaneous, causing uptime problems in which access to data is prevented or delayed. In addition to being undesirable, this may also violate a service level agreement (SLA) between the storage service and the customers.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A distributed storage system includes a set of table controllers collectively configured to store a plurality of partitions of a logical table. The set of table controllers includes a first table controller. The logical table includes a plurality of rows. For each partition of the plurality of partitions, a corresponding one of the set of table controllers is configured to store a subset of the plurality of rows of the logical table across a plurality of individual pages. The distributed storage system includes a management controller configured to update a schema of the logical table from a first schema definition to a second schema definition by, for each of the plurality of partitions, sending an update command indicating the second schema definition to the corresponding one of the set of table controllers. The first table controller corresponds to a first partition of the plurality of partitions. The first partition of the plurality of partitions includes a first subset of the plurality of rows of the logical table. The first table controller is configured to, prior to receiving the update command from the management controller, include an identifier of the first schema definition within each page of data for the first subset. The first table controller is configured to, subsequent to receiving the update command from the management controller, when writing each new page of data for the first subset, include an identifier of the second schema definition.

In other features, the first table controller is configured to, in response to receiving a read request for a first page of data for the first subset subsequent to receiving the update command from the management controller: in response to the page of data including the identifier of the first schema definition, adapt the first page of data to the second schema definition and transmit a response to the read request based on the first page of data.

In other features, the first table controller is configured to, in response to receiving a read request for a first page of data for the first subset subsequent to receiving the update command from the management controller: in response to the page of data including the identifier of the second schema definition, adapt the first page of data to the first schema definition and transmit a response to the read request based on the first page of data.

In other features, the first table controller is configured to, in response to receiving a read request for a first page of data for the first subset subsequent to receiving the update command from the management controller: in response to the page of data including the identifier of the first schema definition and the read request specifying the identifier of the second schema definition, adapt the first page of data to the second schema definition; in response to the page of data including the identifier of the second schema definition and the read request specifying the identifier of the first schema definition, adapt the first page of data to the first schema definition; and transmit a response to the read request based on the adapted first page of data.

In other features, the first table controller is configured to, in response to receiving the update command from the management controller: set a target version of the first partition to a new version specified by the update command; subsequent to setting the target version, reload the first partition; and while reloading the first partition, set a current version of the first partition to the new version. In other features, the first table controller is configured to, subsequent to receiving the update command from the management controller: when writing index data for the first subset, include the identifier of the second schema definition.

In other features, the first table controller is configured to, subsequent to receiving the update command from the management controller: when performing garbage collection on index data for the first subset, include the identifier of the second schema definition when rewriting the index data for the first subset. In other features, the second schema definition includes an identification of columns of the logical table, a designation of which of the columns uniquely identify a row, and a designation of which of the columns defines the partitions.

In other features, the first table controller is configured to store the subset of the plurality of rows in a set of data pages. The first table controller stores an index of the set of data pages in a set of index pages. Each data page of the set of data pages includes a schema definition identifier. In other features, the first table controller is configured to store customer data in blocks separate from the set of data pages. The set of data pages includes pointers to the blocks.

A method of operating a distributed storage system includes storing a plurality of partitions of a logical table. The logical table includes a plurality of rows. For each partition of the plurality of partitions, storing the partition includes storing a subset of the plurality of rows of the logical table across a plurality of individual pages. The method includes receiving a command to update a schema of the logical table from a first schema definition to a second schema definition. The method includes, in response to receiving the command, individually updating each partition of the plurality of partitions to the second schema definition. For a first partition of the plurality of partitions, storing the first partition includes, prior to receiving the command, maintaining an identifier of the first schema definition within each page of data for a first subset of the plurality of rows of the logical table. For the first partition, updating the first partition includes inserting an identifier of the second schema definition when writing each new page of data for the first subset.

In other features, the method includes, in response to receiving a read request for a first page of data for the first subset subsequent to receiving the command: in response to the page of data including the identifier of the first schema definition, adapting the first page of data to the second schema definition and transmitting a response to the read request based on the adapted first page of data; and in response to the page of data including the identifier of the second schema definition, transmitting a response to the read request based on the non-adapted first page of data.

In other features, the method includes, in response to receiving a read request for a first page of data for the first subset subsequent to receiving the command: in response to the page of data including the identifier of the second schema definition, adapting the first page of data to the first schema definition and transmitting a response to the read request based on the adapted first page of data; and in response to the page of data including the identifier of the first schema definition, transmitting a response to the read request based on the non-adapted first page of data.

In other features, the method includes, in response to receiving a read request for a first page of data for the first subset subsequent to receiving the command: in response to the page of data including the identifier of the first schema definition and the read request specifying the identifier of the second schema definition, adapting the first page of data to the second schema definition; in response to the page of data including the identifier of the second schema definition and the read request specifying the identifier of the first schema definition, adapting the first page of data to the first schema definition; and transmitting a response to the read request based on the adapted first page of data.

In other features, the method includes, in response to receiving the command, setting a target version of the first partition to a new version specified by the command; subsequent to setting the target version, reloading the first partition; and, while reloading the first partition, setting a current version of the first partition to the new version.

In other features, the method includes, subsequent to receiving the command: when writing index data for the first subset, including the identifier of the second schema definition. In other features, the method includes, subsequent to receiving the command: when performing garbage collection on index data for the first subset, including the identifier of the second schema definition when rewriting the index data for the first subset.

In other features, the second schema definition includes an identification of columns of the logical table, a designation of which of the columns uniquely identify a row, and a designation of which of the columns defines the partitions. In other features, the method includes storing the subset of the plurality of rows in a set of data pages and storing an index of the set of data pages in a set of index pages. Each data page of the set of data pages includes a schema definition identifier. In other features, the method includes storing customer data in blocks separate from the set of data pages. The set of data pages includes pointers to the blocks.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 2:
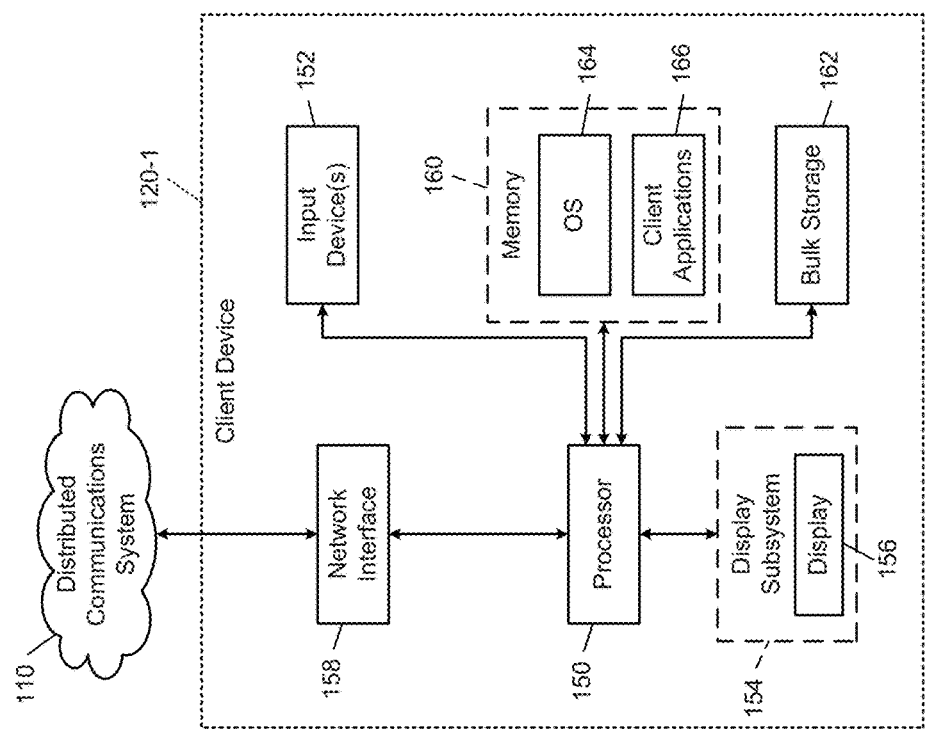
FIG. 2 is a functional block diagram of an example implementation of a client device executing applications that access cloud storage of the distributed computing system.

The present disclosure describes a distributed upgrade framework for a distributed, partitioned storage system. In various implementations, partitions are upgraded separately and each partition maintains state data indicating the version of the partition. The disclosure includes systems and methods that gradually update stored data to reflect an updated schema while presenting to customers a uniform interface across different schema versions.

The upgrade is done dynamically and may even be performed without affecting the uptime experienced by a user. The process described below may be performed separately from deployment of storage code and therefore enhances simplicity and manageability over the prior art. Further, by supporting per-partition upgrades, a safer incremental deployment can be used, which reduces side effects in the event of unexpected events. Having a dynamic and safer upgrade approach allows new features and improvements to be deployed (flighted) when ready, rather than waiting for the next calendar date on which a major new version is released.

Traditionally, changing data schemas, adding new data schemas, and adding new indices required rewriting substantial amounts of index and/or user data. The mechanism described in this disclosure adds programmatic control to manage data defined by different schemas within the same partition. Some implementations even allowing the customer to control which schema to use when accessing data. This allows schemas to be added and changed with higher reliability and availability using a standardized process. The lower barrier to adding and changing schemas allows for more agile feature and performance developments, with schema changes no longer being complex, manual operations.

In a range-partitioned system, each partition has a unique key range and serves independent data. In other words, each partition is responsible for a contiguous key range that does not overlap with the key ranges of other partitions. Each partition can be served by a different server, so that partitions can be moved within a group of servers—referred to in this disclosure as a "storage stamp"—to balance load. In addition, partitions can be dynamically split and merged to facilitate the load balancing. For example, a partition that has grown to be larger (in terms of storage size or access rate) than average may be split into smaller partitions so that the smaller partitions can be distributed across the storage stamp.

The present disclosure is relevant to storage systems, such as distributed (or, "cloud") storage systems, that offer one or more storage services. For example, binary large objects (blobs) can be stored using a "blob" storage service. In a block blob storage service, separate blocks of data form a single blob. As an example, the block blob service may be used to store media files, with each picture or movie being a separate blob.

In a page blob service, the blob is composed of data for a range of addresses. A page blob may be used as a virtual disk by a computer, such as a virtual machine operating in the cloud. The range of addresses stored in the page blob may correspond to hard drive addresses presented to the virtual machine, such as a range of logical block addresses (LBAs).

A file storage service may store individual files. The file storage service may provide access to these files using a standardized protocol, such as the server message block (SMB) protocol and, more particularly, the common internet file system (CIFS) protocol.

Another storage service is a table storage service, which is a key-value attribute store. The table storage service is schema-less and can be used as a NoSQL data store. A further storage service is a queue storage service in which numbered messages are stored. The queue service may be thought of as a subset of the table service in which the key is message number or message ID.

In various implementations, every storage service offered by the distributed storage system has a backing index that tracks the user objects and pointers associated with those objects. The index is persisted (persistently stored) in a data structure referred to as a file table. For table and queue storage services, the user data may be stored within the file tables themselves. For blob storage services, the file tables may contain pointers to the blob data. The schemas of the file tables are one type of attribute that can be updated according to the present disclosure.

Each partition processes read, write, and delete requests. Every delete creates data that is no longer valid, which may be referred to as "garbage." Writes also can create garbage if they overwrite any previously valid data. Additionally, index management operations create garbage. For example, file table pages that are no longer valid are considered garbage. This freeing of old data for other uses is referred to as garbage collection.

Each partition is associated with a set of storage streams in which index and user data is stored. A stream is an append-only data structure that stores data into storage servers, described below. Each partition is assigned a unique name, and streams associated with that partition are named with the partition service name. For example, partition1.blobdata includes data for a block blob service, partition1.pagedata contains data for the page blob service, partition1.ftchk and partition1.data contain the file table data, etc.

Each stream is stored as a set of extents that is served by a set of extent node servers. In some implementations, each extent is a fixed length, such as between 0.25 GB and 3 GB. The unit of writing in a stream is an extent and therefore the unit of garbage collection is an extent. Because the stream is append-only, to update an extent a new extent is written and the obsolete data in the old extent represents garbage.

In various implementations, each storage stamp is made up of a collection of XTables. Each XTable may be a set of partitions. These partitions are range-partitioned, meaning that each partition serves a distinct key and all of the partitions in the set cover the full KEY_MIN to KEY_MAX key range. Each XTable starts with a default schema, which partitions inherit. Each partition persists the schema in its local metadata stream.

The schema may be a collection of schemas and there are logically two different kinds of schema: main table schema and nested tables schema. The main table schema is the schema typically interacted with—for example, for blobs, it is the schema for the blob object index, which has the blob name, blob metadata, data pointers, etc.

The nested table schema is a schema nested in some way, typically but not always having a relationship with the main table schema, and is for some specific purpose. For example, blob storage may support deep copying of one blob to another as well as other features that rely on deep copy, such as an incremental copy blob operation, a managed disks copy on read operation, etc. These are long-running copy operations that need their own state. This is stored in a nested row where the sort order is also prefixed with blob name—in some instances, there is a 1-to-1 relationship with the main table schema in a way. In various other implementations, the relationship between the nested table and the main table schemas may be n-to-1 or 1-to-n. Note that individual schemas for main and nested tables may be represented the same way with no difference in representation or interpretation, but only a logical separation.

The partition's object index is separated by schema. This is done with a concept called a table store. Each table store may have a different schema. Each table store has an ID that indicates which schema is applicable to the table store. The ID of the main table store is always 0. For example, for blob storage, ID 0 is for the main table store; ID 1 is for the page range nested table for storing all of the page ranges for page blobs; ID 2 is for copy blob request rows in nested tables described above; ID 3 is a reference count nested table used for the managed disks feature; etc. Many different cloud storage services rely on such data with multiple table stores. As an example of a schema upgrade, another ID (ID 4) may be used for the nested tables holding copy blob request rows to allow for a new managed disks feature.

One of the concepts introduced in this disclosure is partition versioning, which is a mechanism applicable to schema change as well as generic data/metadata format upgrades, fundamental logical change upgrades, protocol upgrades, etc. Each partition adds a current version and a target version, which are dynamic and stored in the metadata stream. There are also hard-coded minimum, maximum, and default versions in the software. The minimum version is the minimum version a partition can be set to, which may generally be the same as the default value. Test use cases may have a different minimum and default version for testing upgrade and other logic. The maximum version is the maximum supported version, and anything between minimum and maximum, inclusive on both sides, is valid.

These versions are schema agnostic. While not a strict technical requirement, being schema agnostic improves and simplifies manageability. Without this, there would be separate range versions for all of the different XTables in the system, of which there may be dozens or more. Further, the number changes over time. Rather than have to maintain scheme-specific versions and range information, one set of versioning information that is schema agnostic is maintained.

The software is configured to recognize what type of partition an upgrade applies to. If an upgrade does not apply to a partition, that partition will automatically upgrade to the new version, making the version upgrade a "no op" (no operation). If an upgrade applies to that partition, the software will follow the logic in the code to perform the version upgrade. In this way, all partitions across all XTables end up as the same version once all version upgrades required are complete.

Version upgrading is dynamic. The storage bits that can handle the upgrade and bump the max supported version are first released. After the release is complete, commands are sent to a table master component, which may know all XTables and partitions in the system. This command contains the key range and requested upgrade—the requested upgrade has different flavors such as specifying an XTable name or set of XTable names. The command may specify a version and the table master infers which partitions to upgrade. The table master then runs a background/long-running job, which sends partition version upgrade commands to all of the partitions.

Upon receiving the command, a partition will check what action to take. If the partition does not need the upgrade, it will update the version and not do anything else, so it stays live the whole time. However, if the partition does need the upgrade, it will set a target version to the desired version, then request to be reloaded. When the table master reloads the partition (based on stamp global resources and throttling logic), the partition has special logic in its partition load (when live requests are not being accepted) to change the current version to the target version. The upgrade is then complete.

Partition reload can be performed very quickly, perhaps requiring only milliseconds, so that the reload is not noticeable to users. This partition version upgrade may be done at the very beginning of the partition load so that the logic in the partition can rely on the new version to decide to use new formats, to upgrade formats, to enable new formats to be accepted, change flags to result in logical behavior differences, change protocols used, etc. All of this can be done on different granularities-a key range (one or more partitions) of one XTable, a whole XTable, multiple XTables, etc. This allows very fine-grained control and flighting (releasing) of new formats gradually, which protects the system by enabling safe deployment/upgrade.

Schema change depends on the partition version upgrade above. Building on top of that, schema change has special logic inside of partition load where, along with the version upgrade logic, schemas are initialized in partition load. If the partition version upgrade contains a schema change, new schemas will be added to the partition or schemas will be changed. For example, a new column can be added to an existing schema, an existing column in an existing schema can be changed, a whole new schema can be added, a schema can be removed, etc. After adjusting the schema in memory, the new schema is persisted to the partition's metadata stream. The partition is now using the new schema.

As indicated above, schemas are versioned. For example, an example main table for blob storage may have a first schema version that supports block blobs. A second schema version may include additional columns to handle new features. A third schema version may support page blobs and snapshots. For example, the third schema version added a version timestamp key column for snapshots, columns used for page blobs, a blob type column to distinguish different blob types, etc. Each partition may store the definitions of all three schemas.

The index for each partition persists the version of the XTable rows. A file table, which may be a persistent log-structured merge-tree (LSM tree) structure, stores the index. More specifically, each page in the file table may contain the schema version used for that page. Also in the partition metadata, each table store (different schema) has its own index and therefore its own file table. So each file table only needs to worry about different versions of the same main or nested table. In this way, the index for a partition can always handle any version.

The partition code may be configured to always use the latest version to write any new data so that old data becomes deprecated. Therefore, garbage collection (GC) also naturally upgrades the version of older data when data is rewritten. So over time, older data formats dissipate. Further, age-based rewriting may be performed, guaranteeing that all old data/formats are gone after a period of time, such as six months.

XTable clients—that is, clients of partitions that make requests to the partition to read/write/modify the data—typically only deal with the main table schema directly, but they can deal with nested schemas as well. A version change may involve: (A) do the schema upgrade on all partitions for a given XTable or set of XTables required for the service; (B) do a configuration change to enable use of the new version for the service. That is, it is a two-phase upgrade can be done with still only one deployment of storage code, but that subsequently executes two steps to complete the upgrade and begin use of the new schema.

XTable clients will typically be on either the latest version or second-latest version (latest version—1) during an upgrade. Although typical, there is no requirement that a client be on the latest or second-latest schema version. In fact, the table server may retain schema definitions indefinitely so that a client operating on version 1 will be able to obtain data regardless of how many intervening versions of the schemas there have been. For example, assume that there is a schema upgrade for a blob XTable from version 3 (V3) to version 4 (V4). As part of the server-side upgrade, clients may be informed of the schema upgrade. Therefore, the clients and the servers will be on V4. However, while the upgraded partitions will write new data in V4, soon after the upgrade the vast majority of existing data will still be V3. Because the XTable clients have upgraded to V4, they may communicate in V4 and expect V4 data in the response. To handle this, the table server will automatically respond to a client expecting V4 data by upgrading any V3 data to V4 in memory before returning the data to the client.

This upgraded data may then be written back to the XTable. However, since writing data is generally more expensive (in terms of resources) than an in-memory upgrade of the data, the upgraded data may be discarded. This portion of the XTable will later be updated when another process causes a write, such as when garbage collection is performed or when new write data is received from the customer.

Upgrading old schema data to a newer schema is done in iteration logic in a table server. Memory table iterators and file table iterators may operate on memory tables and file tables, respectively. When constructing these iterators, the schema version (based on what the client requested) to use is passed into them so they know how to convert if required. When iterating, before interpreting/returning any row—for returning but also for other purposes such as filtering—the iterator checks if a conversion is needed for the schema. If so, the iterator converts by comparing all differences in the row's schema and the desired schema and compiles the list of differences. The row logic then adjusts the row to match the new schema. Added columns are set to default fixed or calculated values defined by the schema.

A row structure is a representation of a row in the index for a certain schema. Rows in the index are schema agnostic—they contain simply length, table store ID, flags, and column offsets (implying sizes), and error-checking code such as a cyclic redundancy check (CRC) code. Common logic may handle and manipulate rows, but the caller needs to pass down a schema or sufficient information about the schema for the row to be interpreted.

Client and Server

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 1:
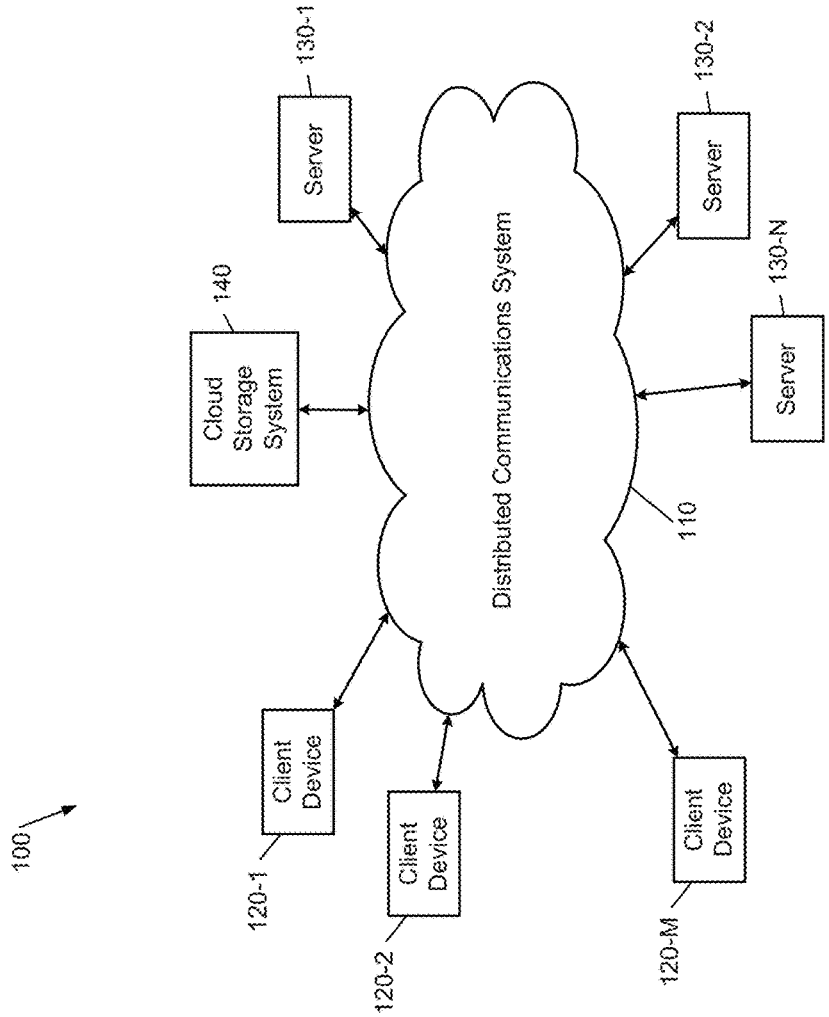
FIG. 1 is a simplified block diagram of an example distributed computing system including a cloud storage system.

FIG. 1 shows a simplified example of a distributed computing system 100. The distributed computing system 100 includes a distributed communications system 110, one or more client devices 120-1, 120-2, . . . , and 120-M (collectively, client devices 120), and one or more servers 130-1, 130-2, . . . , and 130-M (collectively, servers 130). M and N are integers greater than or equal to one. The distributed communications system 110 may include a local area network (LAN), a wide area network (WAN) such as the Internet, or other type of network. The client devices 120 and the servers 130 may be located at different geographical locations and communicate with each other via the distributed communications system 110. The client devices 120 and the servers 130 connect to the distributed communications system 110 using wireless and/or wired connections.

The client devices 120 may include smartphones, personal digital assistants (PDAs), tablets, laptop computers, personal computers (PCs), etc. The servers 130 may provide multiple services to the client devices 120. For example, the servers 130 may execute software applications developed by one or more vendors. The server 130 may host multiple databases that are relied on by the software applications in providing services to users of the client devices 120.

A cloud storage system 140 stores data on behalf of one or more of the servers 130 and/or on behalf of one or more of the client devices 120. This data may be used as a shared storage repository by, for example, the servers 130. Further, the data may be used to communicate among, for example, the servers 130. Additionally, the cloud storage system 140 may be implemented by one or more servers configured similarly to the servers 130.

FIG. 2 shows a simplified example of the client device 120-1. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-1 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the distributed communications system 110.

Figure 3:
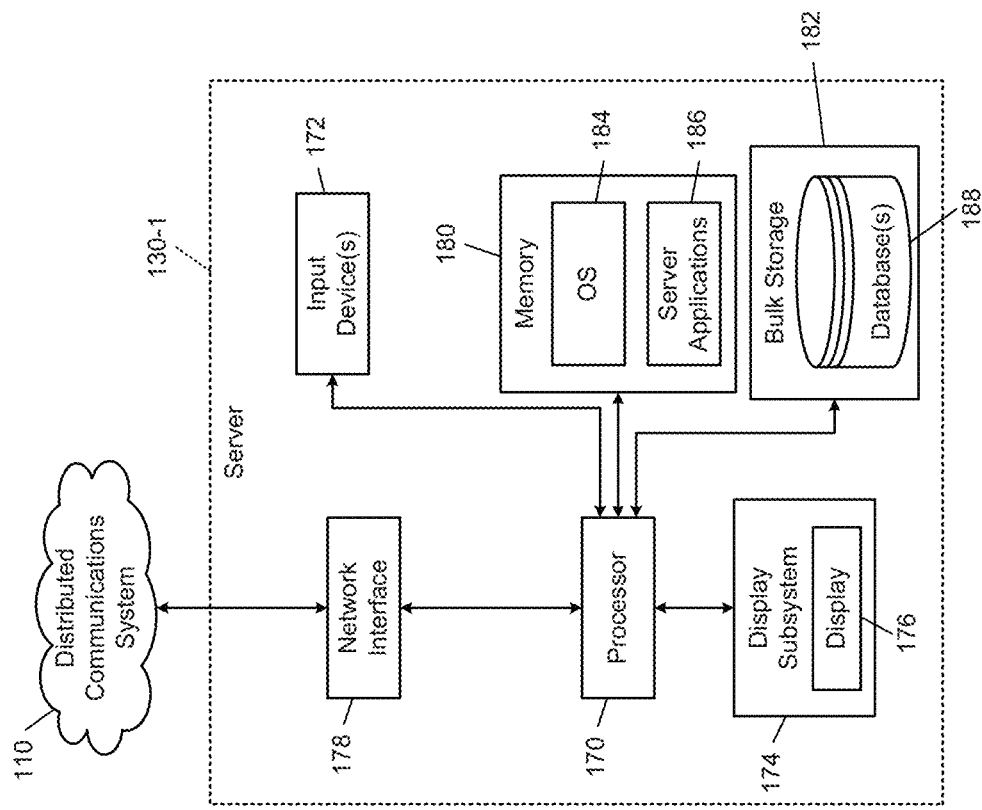
FIG. 3 is a functional block diagram of an example implementation of a server that performs one or more functions of the cloud storage system.

FIG. 3 shows a simplified example of the server 130-1. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized. The server applications 186 may access data, such as block blob or page blob data, from the cloud storage system 140. In some implementations, cloud storage system 140 may include one or more servers configured as shown in FIG. 3, in which the server applications 186 may include operations, such as index management, performed by the cloud storage system 140. The bulk storage 182 may maintain one or more databases 188 that store data, such as index data and user data, used by the server applications 186 to perform respective functions.

Distributed Storage System

Figure 4:
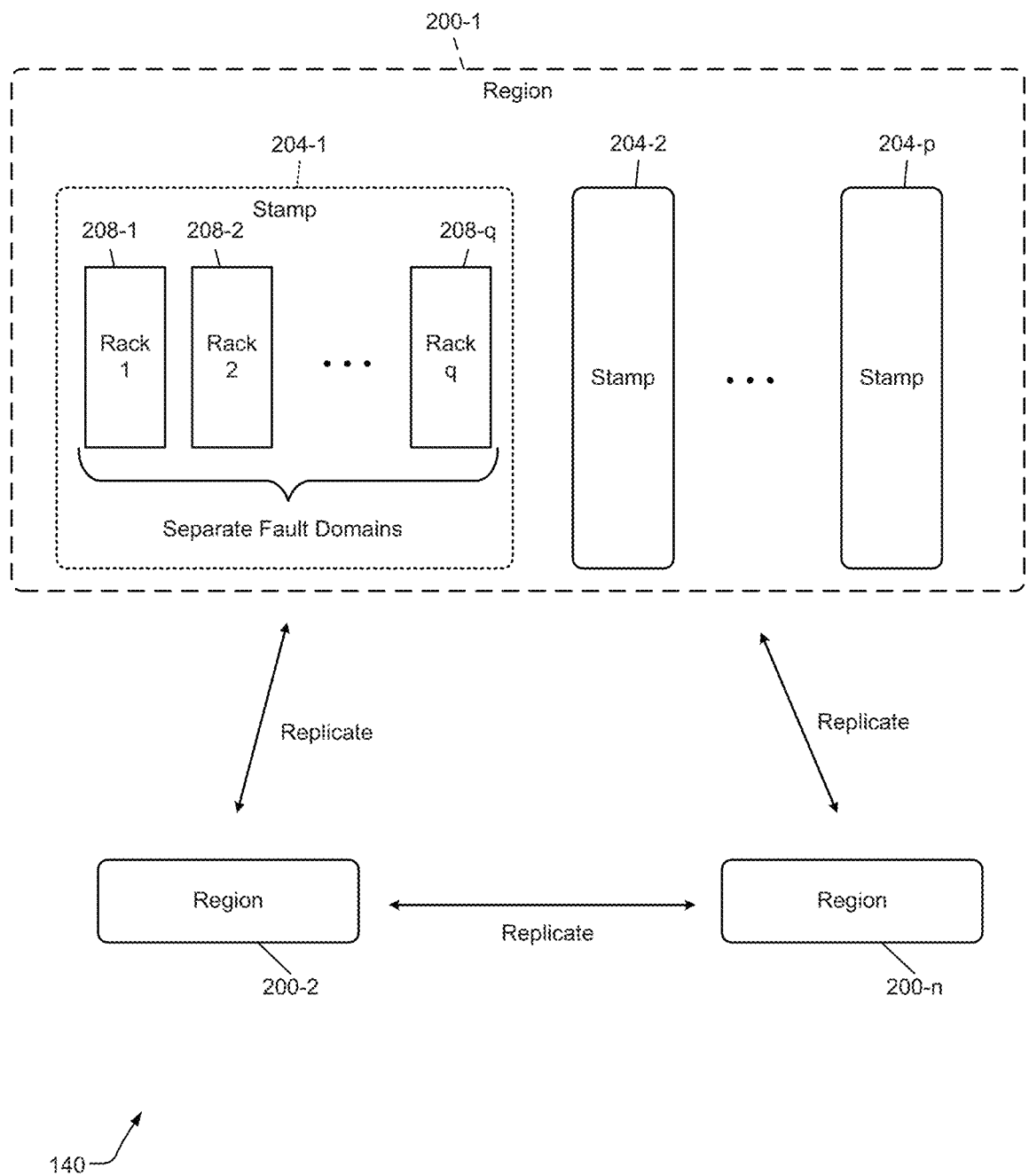
FIG. 4 is a high-level block diagram of an example distributed cloud storage system.

In FIG. 4, the cloud (or, distributed) storage system 140 may include multiple regions 200-1, 200-2, ... and 200-n (collectively, regions 200). The regions 200 may be located in separate geographical locations to provide greater reliability in the face of regional failures.

In each of the regions 200, collections of servers referred to as storage stamps (or, stamps) provide the processing and storage capabilities for the cloud storage system 140. For example, in the region 200-1, storage stamp 204-1, 204-2, ... and storage stamp 204-p (storage stamps 204) are included. Each of the storage stamps 204 may include one or more racks of servers. For example, in FIG. 4, the storage stamp 204-1 is shown with racks 208-1, 208-2, ... and 208-q. Data may be replicated, or mirrored, within one of the storage stamps 204, between the storage stamps 204, and across the regions 200. For example, the extent and geographical reach of replication may be contractually determined by a customer's agreement with the cloud storage system 140.

Figure 5:
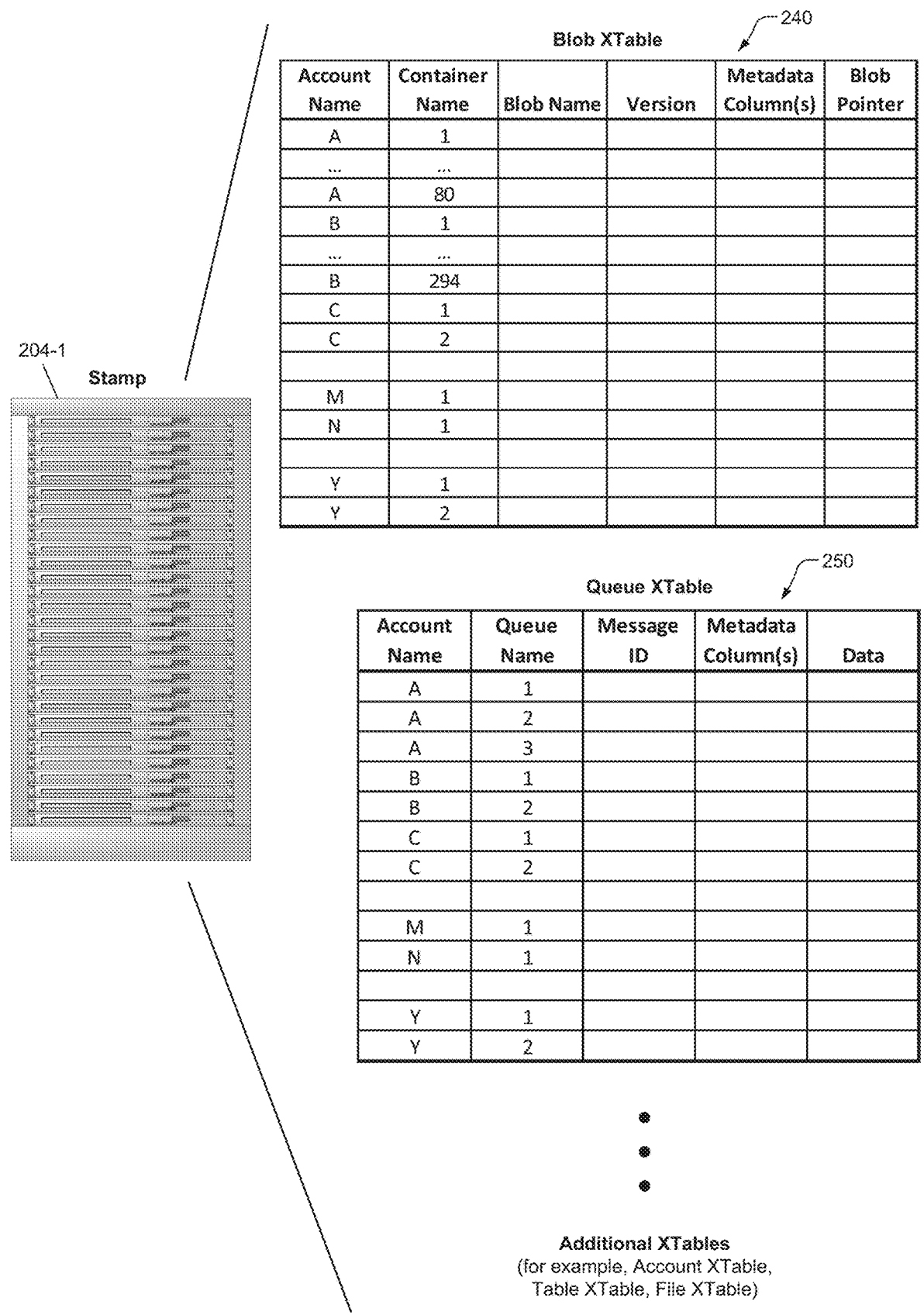
FIG. 5 is a graphical illustration of example logical index tables stored by a cloud storage system.

In FIG. 5, the storage stamp 204-1 is graphically illustrated by a single rack including many servers. The storage stamp 204-1 may store data for some or all of the services offered by the cloud storage system 140. In other words, table, queue, and blob services may all be offered by each individual storage stamp, including the storage stamp 204-1.

Each different storage service may be indexed by a separate table. The top-level index table for each service is named "XTable" to distinguish from other tables within the architecture. For example, a blob storage service is indexed by a blob XTable, while a queue storage service is indexed by a queue XTable.

Additional XTables are stored by the storage stamp 204-1 for services offered by the cloud storage system 140. For example, additional XTables may include a table XTable and a file XTable. Further, XTables that may not be visible to users may be stored, such as an account XTable and a billing XTable. The account XTable keeps track of the accounts established by customers within the storage stamp 204-1 and may include access and authorization data. The billing XTable may include billing information that tracks per-account usage for billing purposes.

The example blob XTable shown in FIG. 5 is referred to by reference numeral 240 and the example queue XTable is referred to by reference numeral 250. The columns of these example XTables are described in more detail with respect to FIG. 6.

Blob XTable

Figure 6:
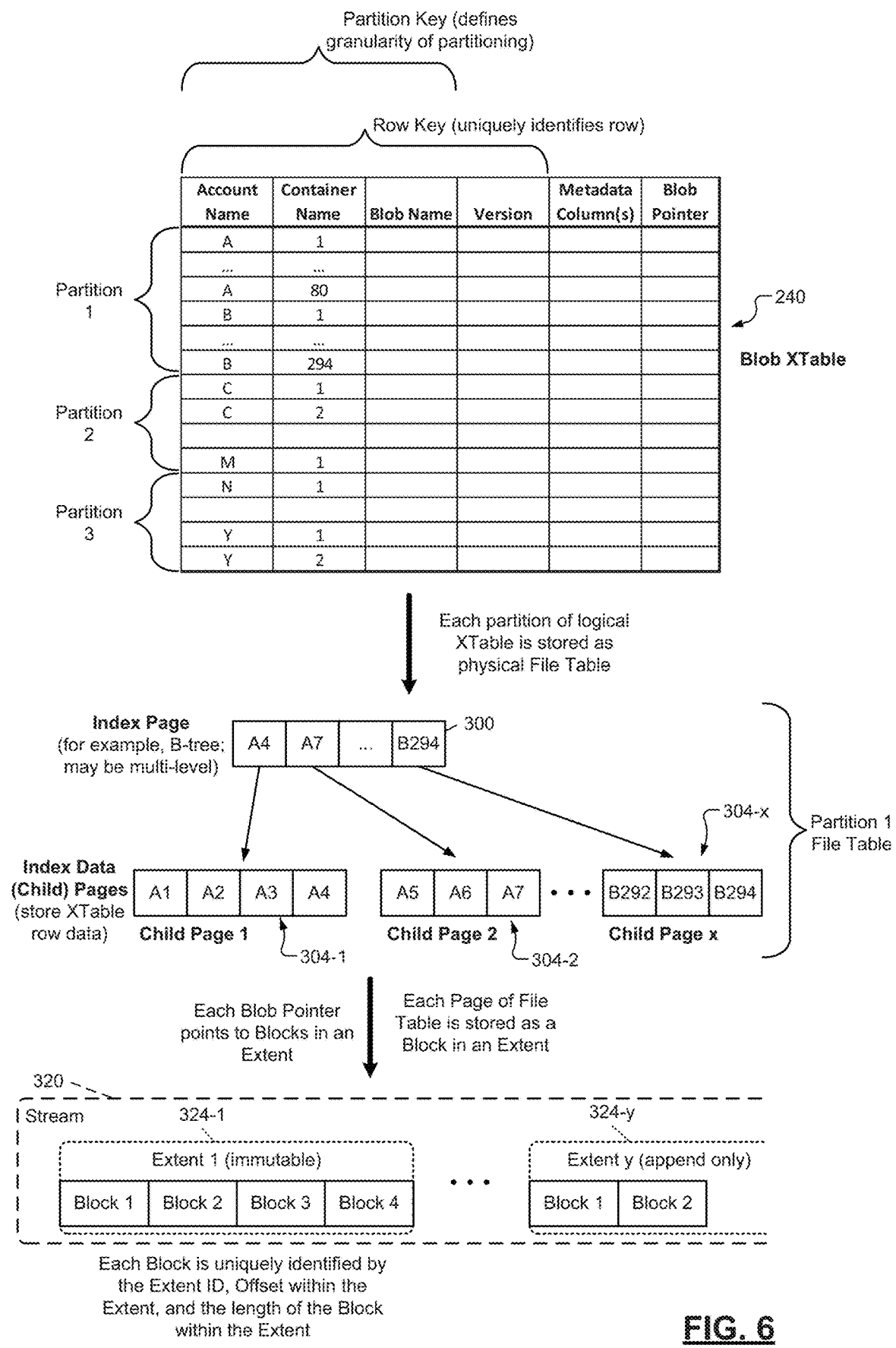
FIG. 6 is a graphical illustration of the relationship between logical and physical indexing and storage of block data.

In FIG. 6, example columns of the blob XTable 240 are shown along with indications of which columns form the row key for the blob XTable 240 and which columns form the partition key of the blob XTable 240. The row key uniquely identifies the row within the blob XTable 240. In other words, there are no two rows in the blob XTable 240 that have the same values for all four columns that form the row key. The partition key establishes the granularity of partitioning. In other words, only columns that are part of the partition key are used to determine how to split (or, partition) the XTable into separate partitions.

The columns shown for the blob XTable 240 are examples only, and may be a subset of the full set of columns in an actual implementation. Further, the columns may be named differently and arranged in any order. The columns of the blob XTable 240, as well as the definition of which columns form the row key and which columns form the partition key, are referred to as the schema of the blob XTable 240.

In this example, the first column shown is account name. Each customer may have multiple storage accounts. The customer may use different storage accounts for different purposes or for different groups of their own customers.

In some implementations, a customer may need to create additional storage accounts if a limit imposed by the cloud storage system is reached. For example, the cloud storage system may impose a specific limit, such as 500 TB, on the amount of storage associated with a storage account. Because a storage account is not split across stamps, limiting the size of storage accounts prevents a single storage account from becoming too large a proportion of a stamp and making load balancing across stamps more difficult.

In some implementations, the account name includes a unique identifier of the customer as well as a name provided by the customer for the account. In other implementations, the account names are specified entirely by the customers but must be globally unique. Within a storage account, there can be multiple blob containers, which are identified by the container name column. Within each container, there can be multiple blobs, each identified with a different name, corresponding to the blob name column.

The contents of a blob may be preserved for the future by requesting a snapshot. Each snapshot corresponds to a different version and therefore the version column identifies which snapshot of the blob is referred to in that row of the blob XTable 240. A blob pointer column points to the specific location of that blob version's data within the storage stamp 204-1. The blob XTable 240 may also include one or more metadata columns (though only one is shown) with additional information for the row.

Although the blob XTable 240 is shown in FIG. 6 in its logical form as a simple two-dimensional table, the blob XTable 240 is actually physically stored in separate partitions. And as described in more detail below, those separate partitions are not simply smaller 2-dimensional tables.

In FIG. 6, the partition key is shown to encompass the account name, the container name, and the blob name. The blob XTable 240 is split, or partitioned, such that all of the rows sharing a same partition key are stored in the same partition. For manageability and performance reasons, partitions may be defined by contiguous ranges of the partition key.

For a simplistic illustration of partitioning, example values are shown for account name and container name. In reality, the account name would generally be much more complex and is certainly not constrained to a single capital letter. Similarly, the container name is not restricted to an integer and is not necessarily sequential. In the blob XTable 240, there are multiple account names. These account names may be accounts for separate users. In other words, data from different users is stored together within the blob XTable 240. This allows load balancing across users so that if one user is heavily using data, that user can be combined in a partition with less active users.

In this simplistic example, Partition 1 includes rows from the blob XTable 240 whose account name and container name vary from A1 up to B294 (in this simple example, blob name and version are ignored). Partition 2 includes C1 through M1. Partition 3 includes N1 through Y2. In reality, the partitions may be defined with one end of the range being open (inclusive) with the other end of the range being closed (exclusive).

As suggested above, the blob XTable 240 is not simply stored as three separate two-dimensional tables, one for each partition. Instead, the rows of each partition are stored as a tree data structure. For example, a multi-level B-tree or B+ tree may be used to store each partition. For Partition 1, a root index page 300 points to subtrees that divide up the partition. For example, the root index page 300 includes entries indicating upper ends of ranges of the row key. In this example, the first entry of the index page 300 points to a subtree including all rows up to A4, the next entry in the index page 300 points to a subtree encompassing rows greater than A4 up to A7, while the final entry in the index page 300 includes rows up through B294.

FIG. 6 shows a single index level, where the pages below the index page 300 are child (or, data) pages that include the actual row data of the blob XTable 240. In various implementations, some or all file tables may have additional levels of indexing such that the partition is subdivided into more and more subtrees before reaching the index data pages.

In FIG. 6, index data page 1 304-1, index data page 2 304-2 and index data page x 304-x (index data pages 304) are shown. As indicated by index page 300, the index data page 304-1 includes entries up through rows A4, including rows A1, A2, A3, and A4. Note that for simplicity of this illustration, the row is being identified simply by the first two columns. In reality, the row would need to be specified by all of the columns forming the row key. In other words, there will likely be many rows with a common account name and container name.

Each of the pages of the Partition 1 file table (that is, the index page 300 and the index data pages 304) is stored as a block in an extent. Further, the blob pointer column of the blob XTable 240 points to one or more blocks in one or more extents that store the actual blob data.

For purposes of illustration, a single stream 320 is shown, which includes Extent 1 324-1 through Extent y 324-y. As described below, the file table pages may be stored in one stream, while blob data is stored in another stream. The final extent in the stream 320, which in this case is Extent y 324-y, is append only. In other words, blocks can be added to Extent y 324-y but existing blocks cannot be modified or deleted. All previous extents within the stream 320, which includes Extent 1 324-1, are immutable (unchangeable).

Therefore, in order to modify any of the data in Block 1, Block 2, Block 3, or Block 4 of Extent 1 324-1, a new extent, such as Extent y 324-y, must be used to store the data. The old data within Extent 1 324-1 is no longer valid and is referred to as garbage. Extents are uniquely identified with an ID and each block within an extent may be uniquely specified by the extent ID, the offset of the block within the extent, and the length of the block.

Storage Stamp

Figure 7:
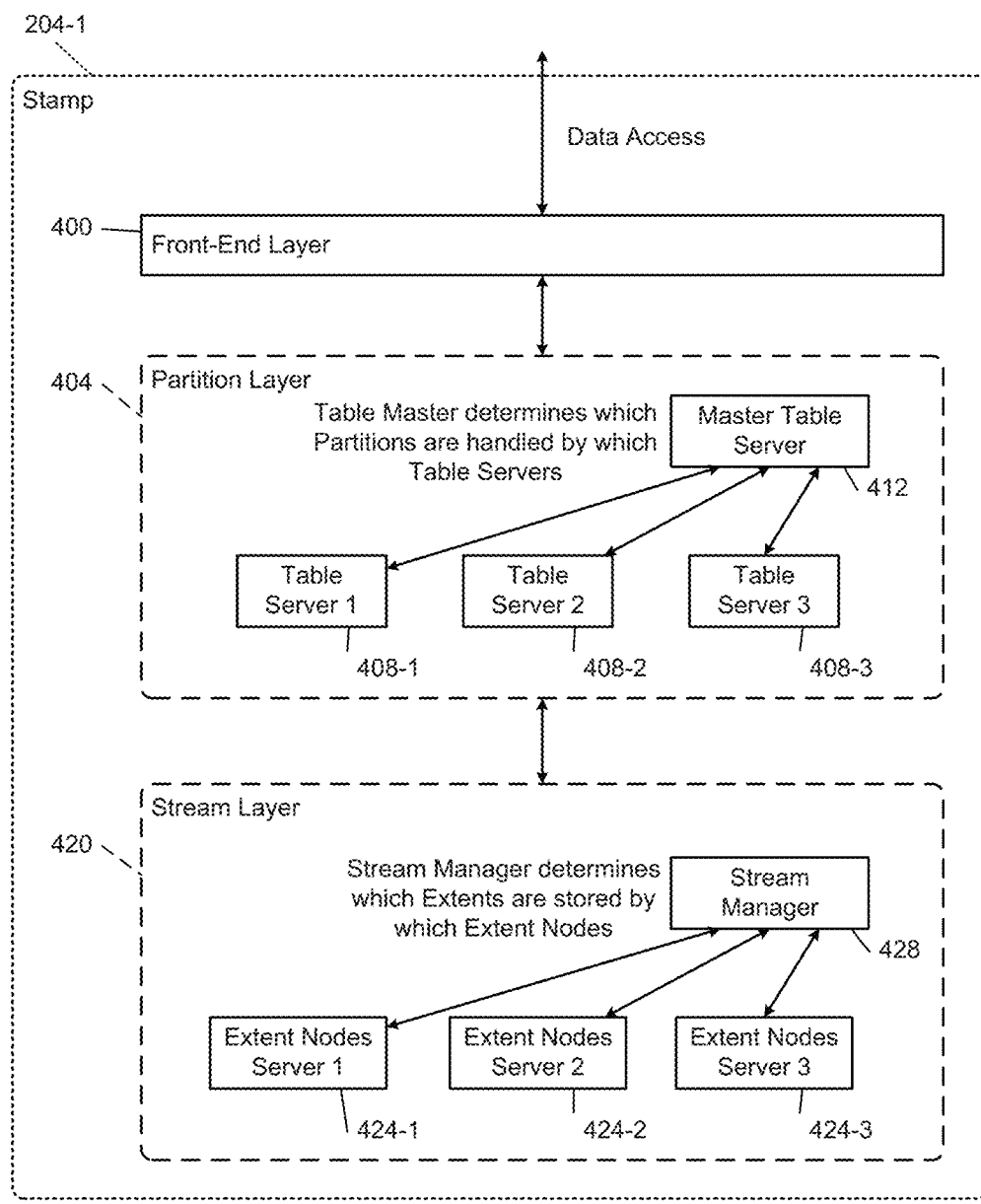
FIG. 7 is a high-level functional block diagram of a storage stamp within the cloud storage system.

In FIG. 7, the storage stamp 204-1 is shown with functional blocks. A front-end layer 400 receives data access requests, including read requests, write requests, and delete requests. These data access requests are processed and provided to a partition layer 404, which includes table servers 408-1, 408-2, and 408-3 (collectively, table servers 408). Each one of the table servers 408 handles one or more partitions, and the assignment of partitions to the table servers 408 is coordinated by a master table server 412. The front-end layer 400 therefore provides the processed data access requests to the table servers 408 depending on which partition the data access request pertains to.

The table servers 408 maintain indices for partitions, such as one or more partitions of the block blob XTable 240 and one or more partitions of the queue XTable 250. The table servers 408 may perform index management, garbage collection, reading, and writing.

The underlying data used by the table servers 408, including index data and user data, is stored by a stream layer 420. Data stored into the stream layer 420 may be organized as sets of streams. For example, the file tables of FIG. 6 may be stored in one stream, while the actual blob data may be stored in a different stream. Each stream is an ordered sequence of extents. Each extent is stored by an extent node server, three of which are shown in the stream layer for 420 of FIG. 7: extent node server 1 424-1, extend node server 2 424-2, and extent node server 3 424-3. A stream manager 428 maintains an ordered list of extents the within each stream and determines which of the extent node servers 424 store which extents.

The stream layer 420 may understand only storing blocks within extents within streams, with no semantic understanding of the contents or interrelationship of the streams. Instead, the stream layer 420 is simply responsible for ensuring accurate and available storage of information.

Pointer Hierarchy

Figure 8:
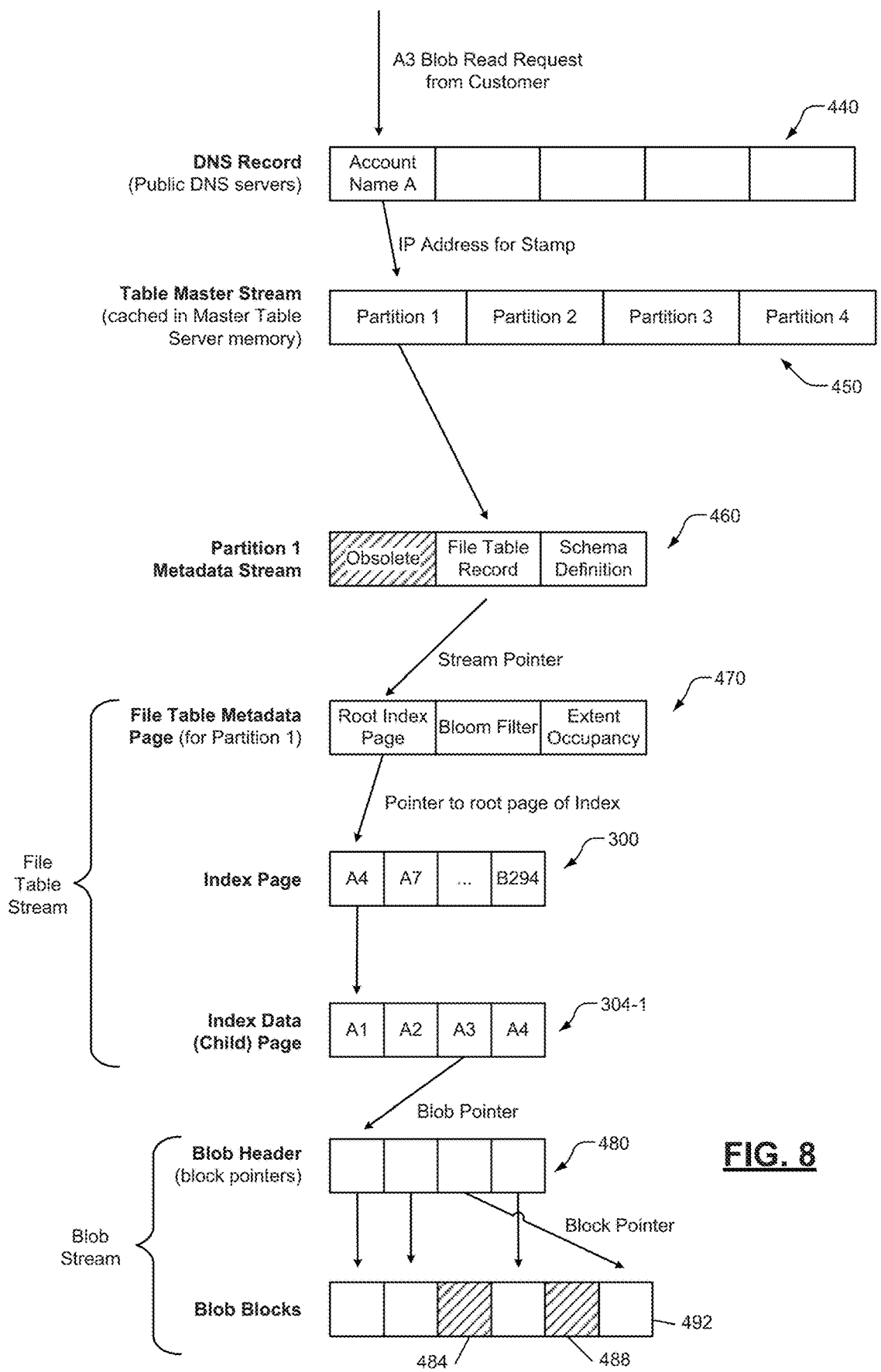
FIG. 8 is a simplified graphical illustration of an indexing hierarchy for a block data structure.

FIG. 8 shows further details of an example implementation of the XTable storage architecture shown in FIG. 6. In the example of FIG. 8, a customer forms a blob read request by specifying a domain name. The domain name is based on the account name of the blob of interest. This domain name is registered in the public DNS and therefore resolves to an internet protocol (IP) address of the stamp. For example, the IP address may be of the front end layer 400 of the storage stamp 204-1.

All of the accounts for a single stamp may resolve to the same IP address or, for load balancing purposes or other reasons, the different accounts may resolve to different IP addresses of the stamp. Because the domain name is account-specific, the account can be shifted to a different stamp by updating the domain name.

In various implementations, the cloud storage system 140 may have a predefined domain name, where the account name is prepended to create a subdomain. As one example only, for the AZURE storage system from Microsoft Corp., the predefined domain name may be blob.core.windows.net. In this example, an account name of "A" corresponds to a subdomain of a.blob.core.windows.net. As a result, a public DNS server resolves a.blob.core.windows.net to a specific IP address for the stamp (a DNS record is depicted at 440).

In this example, the blob read request specifies row A3 (as above, for simplicity, the blob name and version number columns are ignored). The blob read request is transmitted to the IP address specified by the account-name-specific domain name. The blob read request is provided to the master table server 412, which identifies which partition corresponds to the blob read request. For example only, the blob read request may include a uniform resource locator (URL) in which the partition name is encoded.

The master table server 412 may have a mapping 450 cached in memory from partition name to a corresponding metadata stream of the partition on a specific table server. The persistent record of the mapping 450 may be stored in the stream layer 420.

The metadata stream for a partition, such as metadata stream 460 for Partition 1, includes a file table record with a stream pointer to a corresponding file table metadata page 470. Each time the file table metadata page 470 is updated (to be clear, a copy of the file table metadata page 470 is written with updated data), a new file table record is created in the metadata stream 460 to point to the new file table metadata page. The prior file table record in the metadata stream 460 is then obsolete (an example of an obsolete file table record is shown in FIG. 8 with cross-hatching). The metadata stream 460 also includes one or more schema definitions, which may define the schema used for index pages, such as the root index page 300, and the schema used for index data pages, such as the index data page 304-1.

The file table metadata page 470 includes a pointer to the root index page 300 of the index for Partition 1. In addition to the root index page pointer, the file table metadata page 470 may include a Bloom filter. Data written to the cloud storage system 140 may be placed in a memory table or a row data cache before or in addition to being written into the blob stream. A Bloom filter may be maintained for each checkpoint to indicate if the row being accessed may be located in the checkpoint. This allows skipping checkpoints that definitely do not have that row. The file table metadata page 470 may further store (or point to) a record of extent occupancy for garbage collection purposes.

The root index page 300 was previously described in FIG. 6. Although in this example there is only one level of index, practical implementations may have multiple index levels and the number of levels may vary between partitions, and may vary over time for a specific partition. If the blob read request specifies a row with a key that is less than or equal to A4, the index page 300 indicates the index data page 304-1, which was also shown in FIG. 6. For this example, assume that row A3 was requested by the blob read request.

The index data page 304-1 points to a blob header 480. The blob header 480 includes a list of pointers, each pointer pointing to a block where the blob data itself is stored. For example, each pointer may include an extent ID, an offset of the block within the extent, and a length of the block. In other implementations, the length of the block may be stored within the extent itself at the beginning of the block as a piece of metadata. In such implementations, the pointers may not need to specify the length of the block.

Whenever one of the blocks is updated, the prior block becomes obsolete and the blob header 480 is replaced with a new blob header. The corresponding block pointer of the new blob header then points to the new block in the stream. To graphically illustrate this, blocks 484 and 488 are shown with crosshatching to indicate their data is no longer valid. The blob header 480 has been updated to point to 492.

Metadata Update

Figure 9:
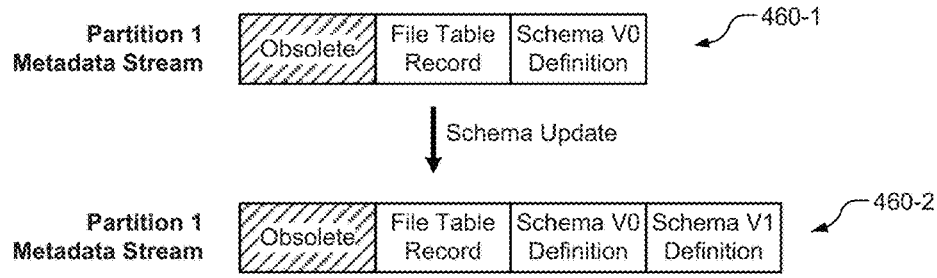
FIG. 9 is a graphical illustration of a schema update performed on a file table metadata page.

In FIG. 9, an example of the metadata stream 460 is shown before (460-1) and after (460-2) a schema update is performed on the partition. The schema definition describes the columns for the XTable rows in this partition, and those rows are stored in the index data pages. As described above, the index data page 304-1 includes the row data from the blob XTable 240 for each of the rows indicated by the index page 300—that is, the rows with a row key of A4 or less. In the simplistic example here, that includes rows A1, A2, A3, and A4. The square marked as A1 includes the A1 row data: values for each column of the A1 row in the blob XTable 240.

The schema definition defines the columns of the blob XTable 240 for this partition. Although the blob XTable 240 in FIG. 6 is shown as a single continuous table, the partitions of the blob XTable 240 are actually stored separately. As a result, the schema definition may vary per partition—in other words, there are times when not all of the rows of a single XTable will have the same columns.

Prior to the schema update, the metadata stream 460-1 includes a version 0 (V0) schema definition. The schema update appends another schema definition (version 1, or V1), which results in the metadata stream 460-2. Version 1 of the schema may define additional or fewer columns, may change which columns form the row key, which columns define the partition key, and may even change the data types associated with one or more columns. Re-partitioning an XTable, such as in response to changing which columns define the partition key, may be delayed until all partitions of the XTable have been updated.

The metadata stream 460-2 retains the earlier (V0) schema definition because, as described in more detail below, not all index data pages will be updated immediately to the new schema definition. An old schema definition may be rendered obsolete (and eligible for garbage collection) after some predetermined period of time, by which point all data described by the old schema definition is guaranteed to have been overwritten. In various implementations, the partition stream may retain all prior schema definitions. For example, a customer may request data using an out-of-date schema definition, and even though no data exists according to that schema definition, the data may be adapted to the out-of-date schema definition before being provided to the customer.

Figure 10:
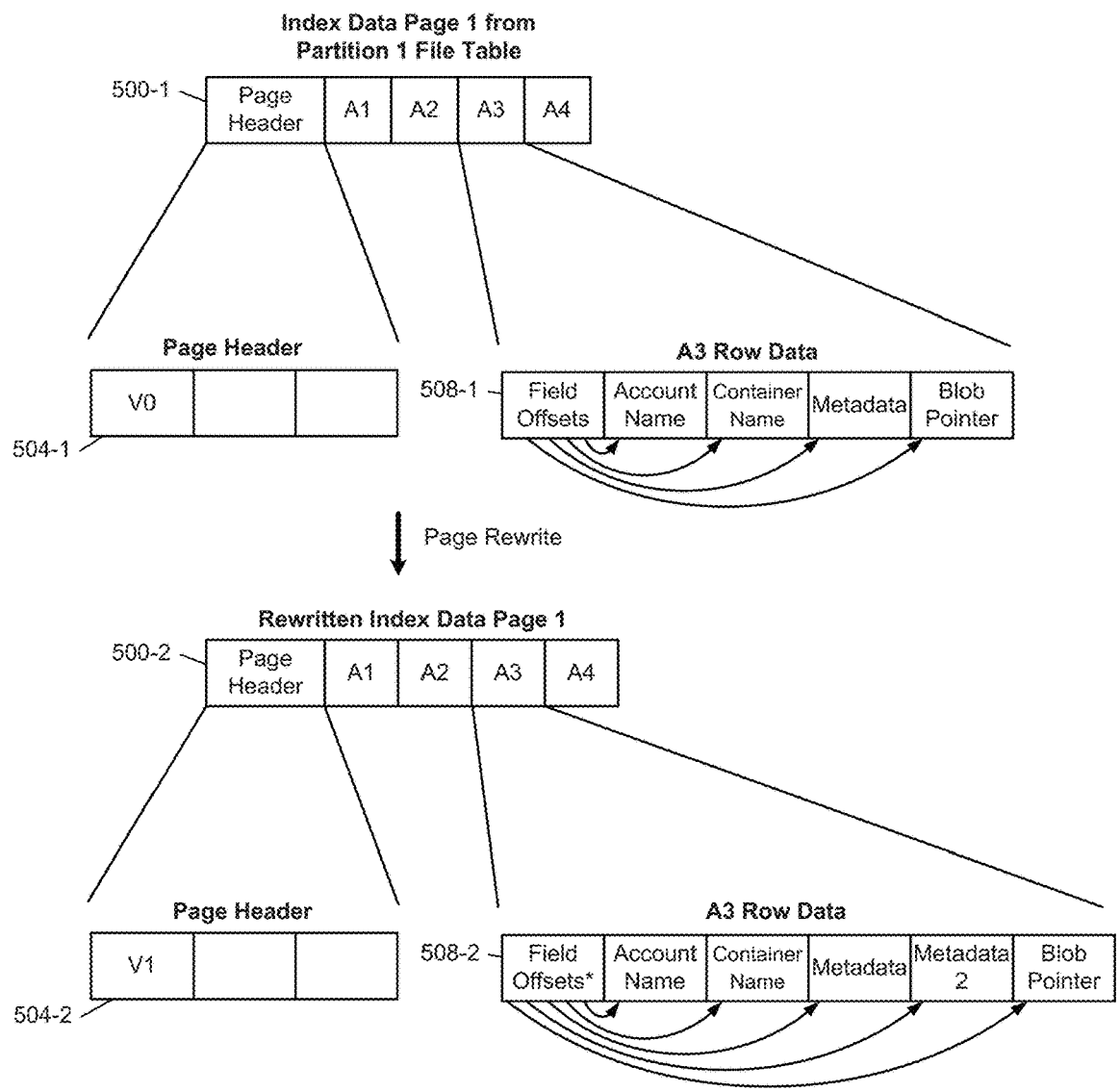
FIG. 10 is a graphical illustration of an example page rewrite performed following a schema update on an index data page of a file table.

In FIG. 10, a graphical illustration of rewriting an index data page following a schema update is shown. An initial version 500-1 of an index data page is shown, and is a more detailed version of the index data page 304-1 depicted in FIG. 6 and FIG. 8. At a predefined location, such as the beginning, of the index data page 500-1, a page header 504-1 encodes metadata about the index data page 500-1.

The metadata in the page header 504-1 includes an identification of the schema version, which in this case is version 0. This means that the row data for rows A1 through A4 is stored according to schema version 0. As an example only, data for row A3 is shown at 508-1. At the beginning of the A3 row data 508-1, a set of field offsets indicates where within the row data 508-1 each column's data is located. These field offsets are stored because each field may not be a static size. In this example, the row data 508-1 includes four fields and therefore four field offsets. In reality, there will generally be additional fields, such as blob name and version as shown in the blob XTable 240. In this example, there is a single "metadata" column.

After the schema update, the file table metadata page 470-2 defines a new schema that, for the purposes of this example, includes a second metadata column. The index data page 500-1 may be rewritten due to an update to its data or based on an internal action, such as garbage collection. The rewrite results in a rewritten index data page 500-2. As described above, this rewritten index data page 500-2 is stored as a new block in the file table stream, and the file table index page pointing to the index data page 500-1 is also rewritten to point to the index data page 500-2.

A page header 504-2 reflects that the row data now conforms to schema version 1. The row data 508-2 itself now includes five field offsets to account for the additional metadata column (named "Metadata 2"). This additional field offset and value for the second metadata column is part of the A3 row data 508-2 as well as the row data for rows A1, A2, and A4.

Master Table Server

Figure 11:
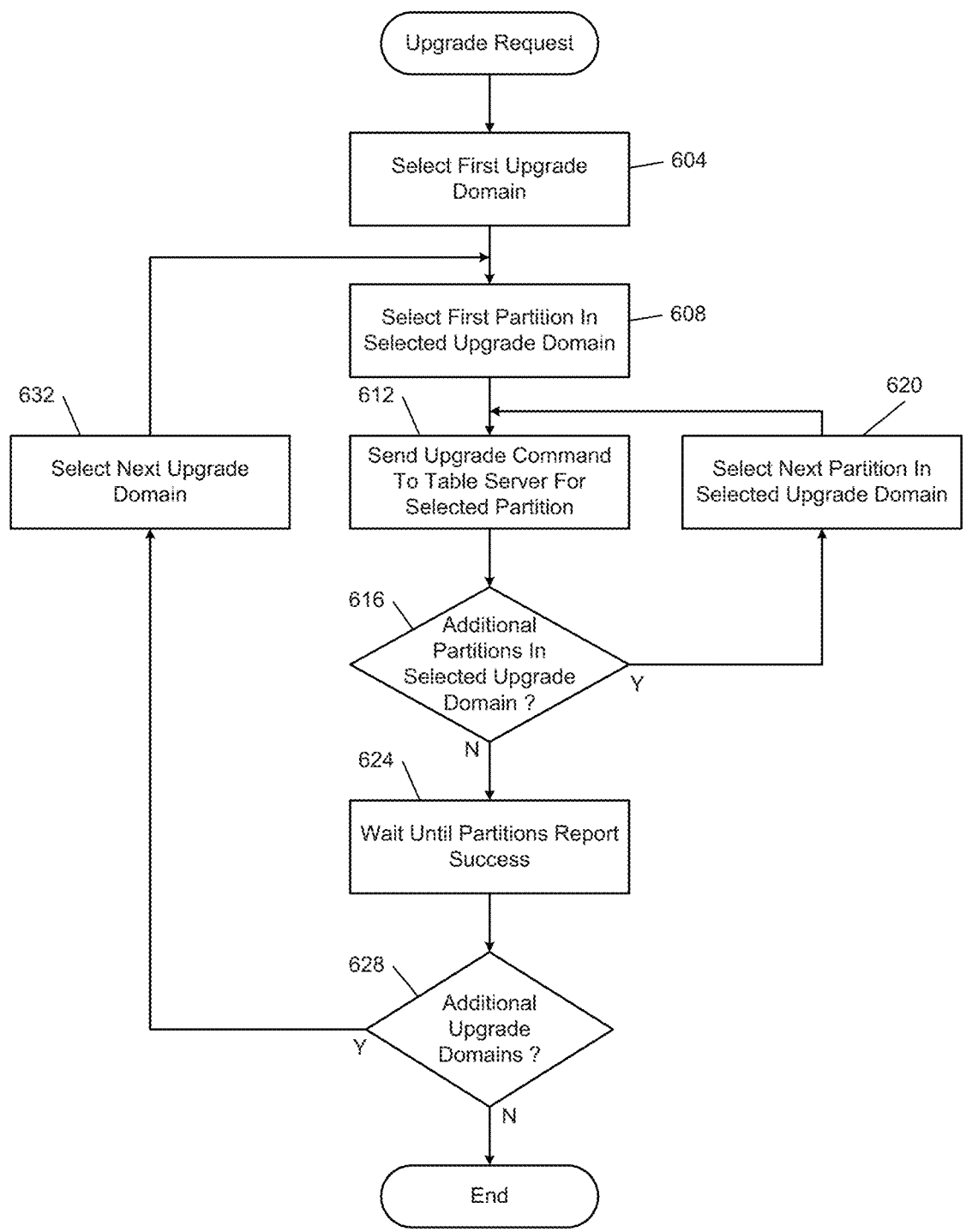
FIG. 11 is a flowchart of example operation of a master table server.

In FIG. 11, a master table server responds to an upgrade request, such as from an administrator of the cloud storage system 140. Control begins at 604, where control selects the first upgrade domain. For example, the upgrade domains may align with fault domains. A fault domain may be a physical grouping of servers that rely on a common set of power and networking connections that is different from other fault domains. Upgrade domains may be subsets within single fault domains so that if the upgrade fails for some reason, the failure can be handled similarly to how a networking or power failure is handled. In other implementations, the upgrade domains may be orthogonal to fault domains.

At 608, control selects the first partition in the selected upgrade domain. For example, when the upgrade domain includes multiple table servers, the set of partitions handled by those table servers may form an ordered list and the first partition in that list is selected. At 612, control sends an upgrade command to the table server indicating the selected partition for upgrade. At 616, control determines whether there are additional partitions in the selected upgrade domain. If so, control transfers to 620; otherwise, control transfers to 624. At 620, control selects the next partition in the selected upgrade domain and returns to 612.

At 624, control waits until the partitions report success. At 628, if there are additional upgrade domains, control transfers to 632; otherwise, control ends the processing of the upgrade request. At 632, control selects the next upgrade domain and returns to 608.

Table Server

Figure 12:
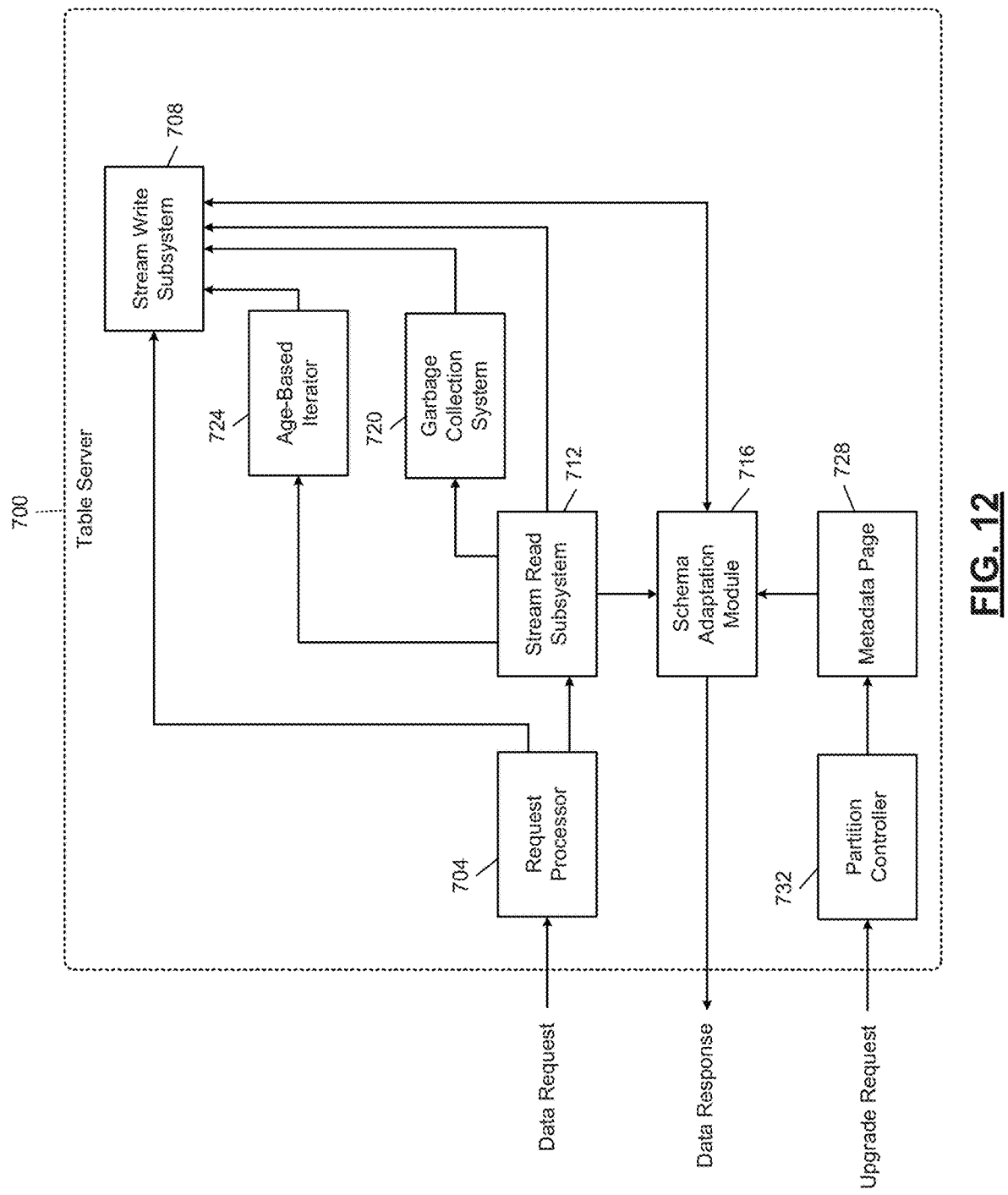
FIG. 12 is a functional block diagram of an example table server.

In FIG. 12, an example table server 700 may be an implementation of the table servers 408 of FIG. 7. The table server 700 includes a request processor 704, which receives a data request from the front end layer 400. If the request is for a write (or delete), the request processor 704 sends the write to a stream write subsystem 708. If the request is for a read, the request processor 704 sends the read request to a stream read subsystem 712.

The stream write subsystem 708 handles writing data to the data stream and updating the indexes accordingly. If the write is to only a portion of a block, the stream write subsystem 708 may read the unchanged portion of the block from the stream read subsystem 712 before writing the updated block to the stream. The stream write subsystem 708 interfaces with a schema adaption module 716 to adapt any data to be written to conform to the latest schema for the partition.

A garbage collection system 720 reads data from the stream read subsystem 712 and writes the data to the stream write subsystem 708. An age-based iterator 724 iterates through each partition and rewrites the oldest data. In this way, even data for which garbage collection is not necessary gets periodically rewritten. When writing data according to requests from the garbage collection system 720 or the age-based iterator 724, the stream write subsystem 708 interfaces with the schema adaptation module 716 so that the rewritten data conforms to the latest schema definition for the partition.

When the stream read subsystem 712 obtains data for a read request, this data is processed by the schema adaptation module 716. For example, the schema adaptation module 716 may update the read data to the latest schema before providing the data response. In other implementations, the schema adaptation module 716 may allow the requestor to specify the schema version to be used for the data response.

The metadata definitions used by the schema adaption module 716 are obtained from a metadata page 728, such as the file table metadata page 470-2 of FIG. 9. A partition controller 732 of the table server 700 receives an upgrade request and performs operations required by the upgrade request, such as adding the new schema definition to the metadata page 728.

Figure 13:
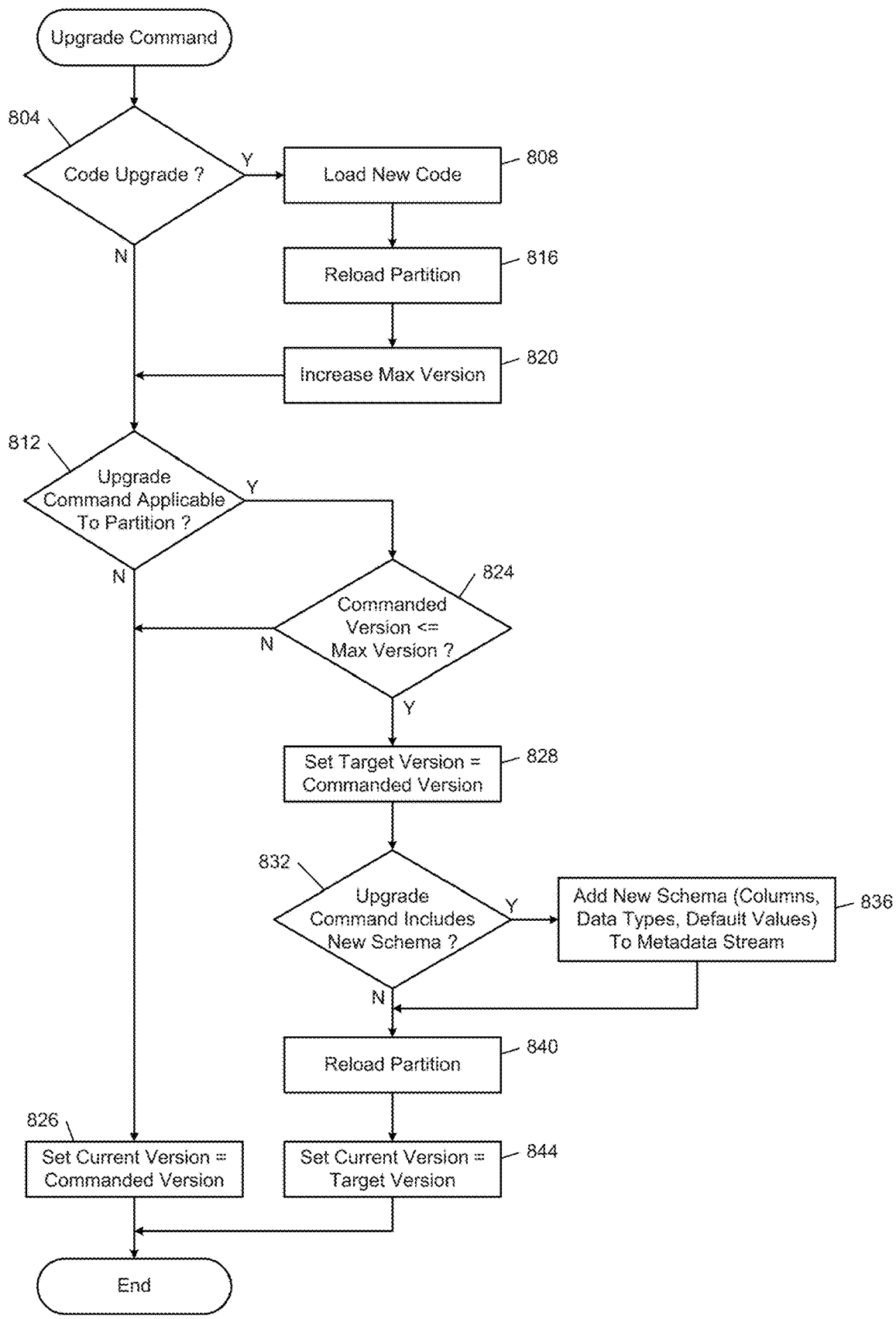
FIG. 13 is a flowchart of example upgrade control performed by a table server.

In FIG. 13, upgrade processing for a table server, such as the table servers 408 in FIG. 7, is shown. In response to the upgrade command from the master table server, control begins at 804. If the upgrade includes a code upgrade, control transfers to 808; otherwise, control transfers to 812. At 808, control loads the new code, such as from a staging server. At 816, the partition is reloaded, which may involve recreating memory indices from log files and reading metadata pages from the metadata stream.

At 820, control may increase the maximum version that the partition can accommodate. For example, new processing rules may accompany a new schema version. The schema and processing rules cannot be upgraded for a partition unless the schema and processing rules have versions less than or equal to the maximum version supported by the partition.

Control then continues at 812. At 812, control determines whether the upgrade command is applicable to the partition. If so, control transfers to 824; otherwise, control transfers to 826. The upgrade command is applicable to the partition if the partition, for example, includes an XTable whose schema will be upgraded. For example, a partition that includes a blob XTable but no queue XTable will not need to upgrade if only the schema for the queue XTable is being updated. At 826, control sets the current version of the partition to the commanded version without further action and control ends.

At 824, control determines whether the commanded version is less than or equal to the maximum version. If so, control transfers to 828; otherwise control signals a failure and ends. At 828, control sets the target schema version for the partition to the commanded version. At 832, control determines whether the upgrade command includes one or more new schemas. If so, control transfers to 836; otherwise control transfers to 840. At 836, control adds a new schema (which includes a specification of the columns, data types, default values, and row and partition keys) to the metadata stream. Control continues at 840, where the partition is reloaded. At 844, control sets the current version of the partition to the target version. Control then ends.

Write Operation

Figure 14:
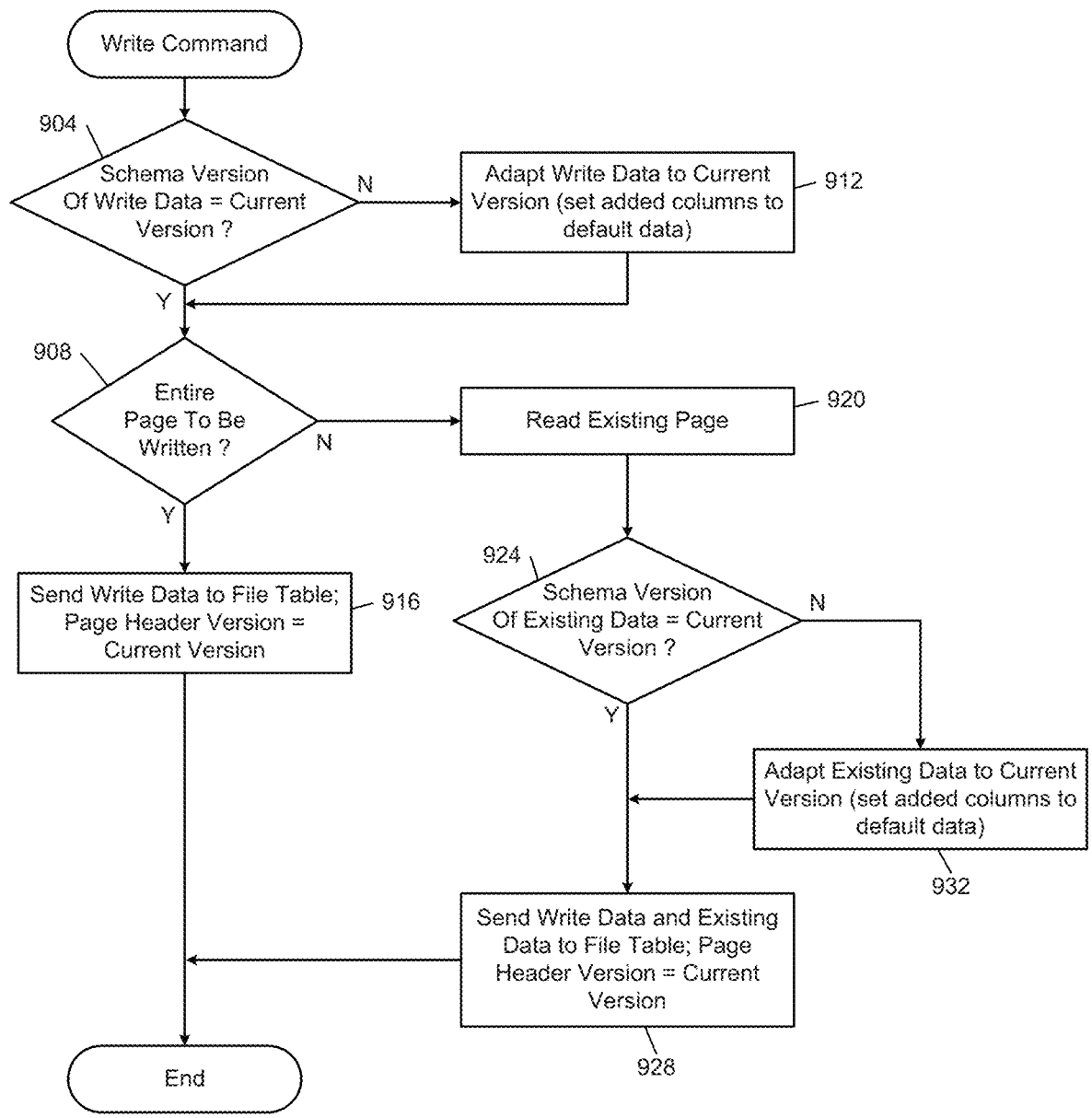
FIG. 14 is a flowchart of example write operation performed by a table server.

In FIG. 14, example write operation for the table server is shown, which may be performed by the stream write subsystem 708 of FIG. 12. In response to a write command, control begins at 904 and determines whether the schema version of the write data is equal to the current version of the partition. If so, control transfers to 908; otherwise control transfers to 912.

At 912, control adapts the write data to the current schema version and continues at 908. Adapting the write data to the current version may include adding or deleting columns. When columns are added, the values in those columns may need to be set to specified defaults. In some implementations, a schema may specify a fixed value or a calculated value for a newly added column. This calculated value may be calculated from values in other columns.

At 908, control determines whether the entire index data page is being written according to the write command. If so, control transfers to 916; otherwise control transfers to 920. At 916, the entire index data page is being written and the write data is therefore sent to the file table stream. The page header for the newly written index data page reflects the current schema version. Control then ends.

At 920, control reads data that is not going to be overwritten from the existing page. Control continues at 924 where, if the schema version of the existing data is already the current schema version, control transfers to 928; otherwise, control transfers to 932. At 932, control adapts the existing data to the current schema version. Control then continues at 928. At 928, control sends the write data and the existing data to the file table. The page header of the newly written child page specifies the current schema version. Control then ends.

Read Operation

Figure 15:
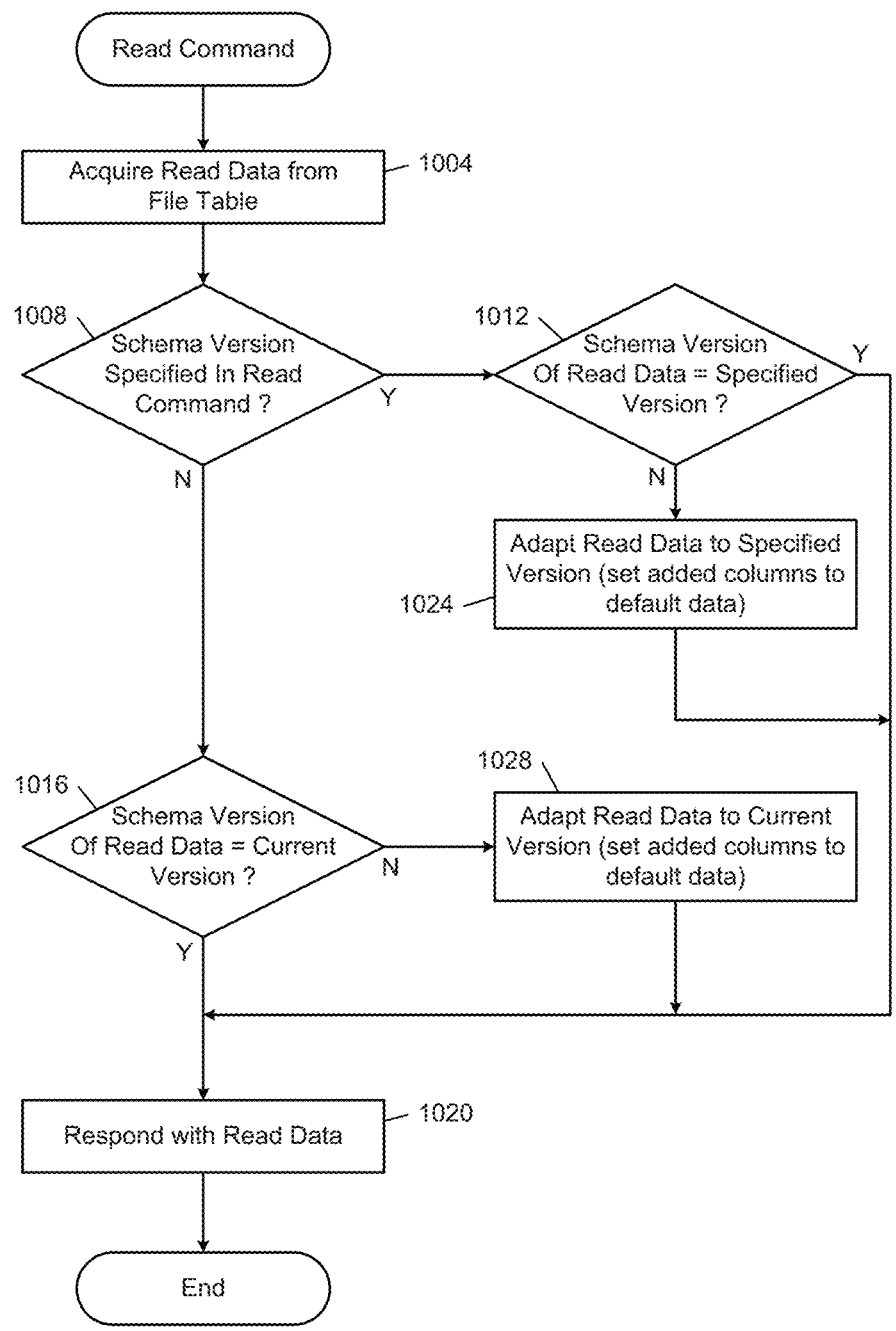
FIG. 15 is a flowchart of example read operation performed by a table server.

In FIG. 15, example read operation for a table server, such as the table servers 408 of FIG. 7, is shown. In response to a read command, control begins at 1004 and acquires read data from the file table. At 1008, control determines whether there is a schema version specified in the read command. If so, control transfers to 1012; otherwise, control transfers to 1016. In implementations where customers are not permitted to specify a schema version in the read command, control may proceed directly to 1016, omitting the test of 1008.

At 1012, control determines whether the schema version of the read data is equal to the version specified in the read command. If so, control transfers to 1020; otherwise, control transfers to 1024. At 1024, control adapts the read data to the version specified by the read command. Control then continues at 1020.

At 1016, control determines whether the schema version of the read data is equal to the current version. If so, control transfers to 1020; otherwise, control transfers to 1028. At 1028, control adapts the read data to be the current schema version. Control then continues at 1020. In other implementations, the default schema version, when a schema is not specified in the read command, may be the prior schema version. This may be chosen as the default so that customers and their applications that have not been updated to understand the new schema will be presented with data that they can interpret. In such implementations, the test at 1016 will test whether the schema version is equal to the prior version and 1028, and the read data would be adapted to the prior version at 1028. At 1020, control responds with the read data, which may have been adapted. Control then ends.

Garbage Collection

Figure 16:
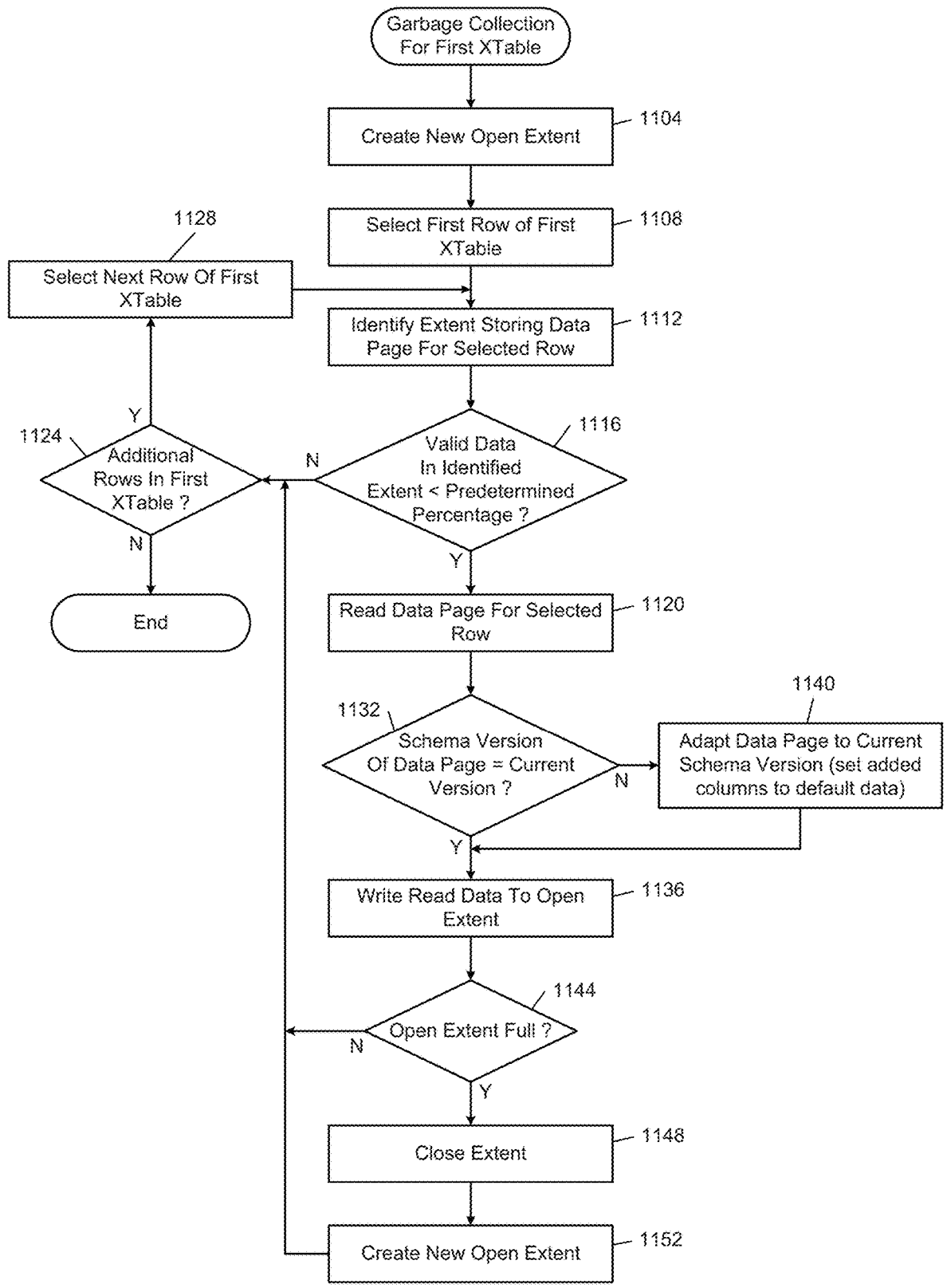
FIG. 16 is a flowchart of example file table garbage collection.

In FIG. 16, a simplified garbage collection process for the file table of a partition of an XTable is shown. Control begins at 1104, where control creates a new open extent in which valid data from garbage-collected extents will be written. In some implementations, control may only open a new extent if there is no extent already open.

At 1108, control selects the first row of the first XTable. At 1112, control identifies which extent stores the data page for the selected row. For example, this may be performed by reading the index pages one level above the index data pages, which include pointers to the locations of the index data pages. At 1116, control determines whether valid data in the identified extent occupies less than a predetermined percentage of the entire extent. If so, control transfers to 1120 to perform garbage collection on that extent; otherwise, control transfers to 1124.

The predetermined percentage may be a fixed value, such as 60%, or may be adaptive, such that a higher percentage is used when the table server is less active. In other words, when the table server has more available processing capacity, more aggressive garbage collection may be performed. The amount of valid data in an extent may be stored in the file table metadata page as extent occupancy, as shown in FIG. 9. At 1124, if there are additional rows in the first XTable, control transfers to 1128; otherwise, control ends garbage collection for the first XTable.

At 1120, control reads the data page for the selected row. At 1132, control determines whether the schema version of the data page is equal to the current version. If so, control transfers to 1136; otherwise, control transfers to 1140. At 1140, the data page is adapted to the current schema version and control continues at 1136. At 1136, the read data, which may have been adapted by 1140, is written to the open extent. At 1144, if the open extent is now full, control transfers to 1148; otherwise, control transfers to 1124. At 1148, control closes the extent, making the extent immutable. At 1152, control creates a new open extent and returns to 1124.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The invention claimed is:

1. A distributed storage system comprising:
a set of table controllers collectively configured to store a plurality of partitions of a logical table, wherein:
the set of table controllers includes a first table controller,
the logical table includes a plurality of rows, and
for each partition of the plurality of partitions, a corresponding one of the set of table controllers is configured to store a subset of the plurality of rows of the logical table across a plurality of individual pages;
a processor; and
a management controller comprising code executable by the processor, the management controller configured to update a schema of the logical table from a first schema definition to a second schema definition by, for each of the plurality of partitions, sending an update command indicating the second schema definition to the corresponding one of the set of table controllers,
wherein the first table controller corresponds to a first partition of the plurality of partitions,
wherein the first partition of the plurality of partitions includes a first subset of the plurality of rows of the logical table,
wherein the first table controller is configured to, prior to receiving the update command from the management controller, include an identifier of the first schema definition within each page of data for the first subset, and
wherein the first table controller is configured to, subsequent to receiving the update command from the management controller, When writing each new page of data for the first subset, include an identifier of the second schema definition.

2. The distributed storage system of claim 1 wherein the first table controller is configured to, in response to receiving a read request for a first page of data for the first subset subsequent to receiving the update command from the management controller:
in response to the page of data including the identifier of the first schema definition, adapt the first page of data to the second schema definition; and transmit a response to the read request based on the first page of data.

3. The distributed storage system of claim 1 wherein the first table controller is configured to, in response to receiving a read request for a first page of data for the first subset subsequent to receiving the update command from the management controller:
   in response to the page of data including the identifier of the second schema definition, adapt the first page of data to the first schema definition; and
   transmit a response to the read request based on the first page of data.

4. The distributed storage system of claim 1 wherein the first table controller is configured to, in response to receiving a read request for a first page of data for the first subset subsequent to receiving the update command from the management controller:
   in response to the page of data including the identifier of the first schema definition and the read request specifying the identifier of the second schema definition, adapt the first page of data to the second schema definition;
   in response to the page of data including the identifier of the second schema definition and the read request specifying the identifier of the first schema definition, adapt the first page of data to the first schema definition; and
   transmit a response to the read request based on the adapted first page of data.

5. The distributed storage system of claim 1 wherein the first table controller is configured to, in response to receiving the update command from the management controller:
   set a target version of the first partition to a new version specified by the update command;
   subsequent to setting the target version, reload the first partition; and
   while reloading the first partition, set a current version of the first partition to the new version.

6. The distributed storage system of claim 1 wherein the first table controller is configured to, subsequent to receiving the update command from the management controller:
   when writing index data for the first subset, include e identifier of the second schema definition.

7. The distributed storage system of claim 6 wherein the first table controller is configured to, subsequent to receiving the update command from the management controller:
   when performing garbage collection on index data for the first subset, include the identifier of the second schema definition when rewriting the index data for the first subset.

8. The distributed storage system of claim 1 wherein the second schema definition includes an identification of columns of the logical table, a designation of which of the columns uniquely identify a row, and a designation of which of the columns defines the partitions.

9. The distributed storage system of claim 1 wherein the first table controller is configured to store the subset of the plurality of rows in a set of data pages, wherein the first table controller stores an index of the set of data pages in a set of index pages, and wherein each data page of the set of data pages includes a schema definition identifier.

10. The distributed storage system of claim 9 wherein the first table controller is configured to store customer data in blocks separate from the set of data pages, wherein the set of data pages includes pointers to the blocks.

11. A method operating a distributed storage system, the method comprising:
   storing a plurality of partitions of a logical table, wherein:
      the logical table includes a plurality of rows, and
      for each partition of the plurality of partitions, storing the partition includes storing a subset of the plurality of rows of the logical table across a plurality of individual pages;
   receiving a command to update a schema of the logical table from a first schema definition to a second schema definition;
   in response to receiving the command, individually updating each partition of the plurality partitions to the second schema definition,
   wherein, for a first partition of the plurality of partitions:
      storing the first partition includes, prior to receiving the command, maintaining an identifier of the first schema definition within each page of data for a first subset of the plurality of rows of the logical table; and
      updating the first partition includes inserting an identifier of the second schema definition when writing each new page of data for the first subset.

12. The method of claim 11 further comprising, in response to receiving a read request for a first page of data for the first subset subsequent to receiving the command:
   in response to the page of data including the identifier of the first schema definition, adapting the first page of data to the second schema definition and transmitting a response to the read request based on the adapted first page of data; and
   in response to the page of data including the identifier of the second schema definition, transmitting a response to the read request based on the non-adapted first page of data.

13. The method of claim 11 further comprising, in response to receiving a read request for a first page of data for the first subset subsequent to receiving the command:
   in response to the page of data including the identifier of the second schema definition, adapting the first page of data to the first schema definition and transmitting a response to the read request based on the adapted first page of data; and
   in response to the page of data including the identifier of the first schema definition, transmitting a response to the read request based on the non-adapted first page of data.

14. The method of claim 11 further comprising, in response to receiving a read request for a first page of data for the first subset subsequent to receiving the command:
   in response to the page of data including the identifier of the first schema definition and the read request specifying the identifier of the second schema definition, adapting the first page of data to the second schema definition;
   in response to the page of data including the identifier of the second schema definition and the read request specifying the identifier of the first schema definition, adapting the first page of data to the first schema definition; and
   transmitting a response to the read request based on the adapted first page of data.

15. The method of claim 11 further comprising, in response to receiving the command:
   setting a target version of the first partition to a new version specified by the command;

subsequent to setting the target version, reloading the first partition; and while reloading the first partition, setting a current version of the first partition to the new version.

16. The method of claim 11 further comprising, subsequent to receiving the command:
when writing index data for the first subset, including the identifier of the second schema definition.

17. The method of claim 16 further comprising, subsequent o receiving the command:
when performing garbage collection on index data for the first subset, including the identifier of the second schema definition when rewriting the index data for the first subset.

18. The method of claim 11 wherein the second schema definition includes an identification of columns of the logical table, a designation of which of the columns uniquely identify a row, and a designation of which of the columns defines the partitions.

19. The method of claim 11 further comprising:
storing the subset of the plurality of rows in a set of data pages; and
storing an index of the set of data pages in a set of index pages,
wherein each data page of the set of data pages includes a schema definition identifier.

20. The method of claim 19 further comprising storing customer data in blocks separate from the set of data pages, wherein the set of data pages includes pointers to the blocks.

* * * * *